(12) United States Patent
Lawson et al.

(10) Patent No.: US 8,863,389 B2
(45) Date of Patent: Oct. 21, 2014

(54) APPARATUS, SYSTEM AND METHOD FOR DETERMINING A SPATIAL LOCATION OF A MATCH-MARK REGION OF EACH OF A TIRE AND A WHEEL

(75) Inventors: Lawrence J. Lawson, Troy, MI (US); George B. Byma, Clarkston, MI (US); Robert Reece, Clarkston, MI (US); Ramsey R. Niazy, Key Colony Beach, FL (US)

(73) Assignee: Android Industries LLC, Auburn Hills, MI (US)

( * ) Notice: Subject to any disclaimer, the term of this patent is extended or adjusted under 35 U.S.C. 154(b) by 402 days.

(21) Appl. No.: 13/300,349

(22) Filed: Nov. 18, 2011

(65) Prior Publication Data

US 2012/0125542 A1    May 24, 2012

Related U.S. Application Data

(63) Continuation-in-part of application No. 13/103,755, filed on May 9, 2011, which is a continuation-in-part of application No. 12/236,162, filed on Sep. 23, 2008, now Pat. No. 8,161,650.

(60) Provisional application No. 60/976,964, filed on Oct. 2, 2007, provisional application No. 61/054,988, filed on May 21, 2008, provisional application No. 61/332,869, filed on May 10, 2010.

(51) Int. Cl.
*G01M 1/16* (2006.01)
*B60C 25/05* (2006.01)
*B60C 25/132* (2006.01)

(52) U.S. Cl.
CPC ......... *B60C 25/0521* (2013.04); *B60C 25/0515* (2013.04); *B60C 25/132* (2013.01)
USPC .............................. 29/894.31; 29/705; 73/468

(58) Field of Classification Search
USPC ........... 73/400, 468; 700/279; 29/705, 894.31
See application file for complete search history.

(56) References Cited

U.S. PATENT DOCUMENTS

| | | | |
|---|---|---|---|
| 3,280,880 | A | 10/1966 | Ericson et al. |
| 3,651,849 | A | 3/1972 | Kaminskas |
| 3,658,109 | A | 4/1972 | Kaminskas et al. |

(Continued)

FOREIGN PATENT DOCUMENTS

| | | |
|---|---|---|
| JP | 10278521 A | 10/1998 |
| JP | 2011148395 A | 8/2011 |
| WO | WO-9852781 | 11/1998 |
| WO | WO-2011143175 A2 | 11/2011 |

OTHER PUBLICATIONS

International Search Report for Application No. PCT/US2012/049717 dated Jan. 31, 2013.

*Primary Examiner* — David Bryant
*Assistant Examiner* — Jason L Vaughan
(74) *Attorney, Agent, or Firm* — Honigman Miller Schwartz and Cohn LLP

(57) ABSTRACT

A method is disclosed. The method includes the step of determining a spatial location of a match-mark region of each of a tire and a wheel, wherein at least one of the tire and the wheel does not include a physical match mark formed upon a surface or within a body portion of the tire and the wheel. A system is also disclosed. An apparatus is also disclosed.

3 Claims, 38 Drawing Sheets

(56) References Cited

U.S. PATENT DOCUMENTS

| | | |
|---|---|---|
| 4,279,438 A | 7/1981 | Singh |
| 4,789,015 A | 12/1988 | Flinn |
| 5,035,274 A | 7/1991 | Kinnick et al. |
| 5,072,765 A | 12/1991 | Kane et al. |
| 5,787,646 A * | 8/1998 | Nakamori ............... 49/502 |
| 5,878,801 A | 3/1999 | Ellis |
| 6,148,892 A | 11/2000 | Koerner et al. |
| 6,176,288 B1 | 1/2001 | Kane et al. |
| 6,286,195 B1 * | 9/2001 | Takahashi ............... 29/407.1 |
| 6,463,982 B1 | 10/2002 | Doan |
| 6,668,213 B2 * | 12/2003 | Takahashi ............... 700/279 |
| 7,065,444 B2 * | 6/2006 | Braghiroli ............... 701/124 |
| RE39,312 E | 10/2006 | Kane et al. |
| 7,617,726 B2 * | 11/2009 | Douglas ............... 73/462 |
| 7,664,576 B2 * | 2/2010 | Ichinose et al. ............... 700/279 |
| 8,011,243 B2 * | 9/2011 | Montanari et al. ............... 73/460 |
| 2005/0165509 A1 * | 7/2005 | Braghiroli ............... 700/279 |
| 2008/0119962 A1 * | 5/2008 | Voeller et al. ............... 700/279 |
| 2008/0277072 A1 | 11/2008 | Hagiwara |

\* cited by examiner

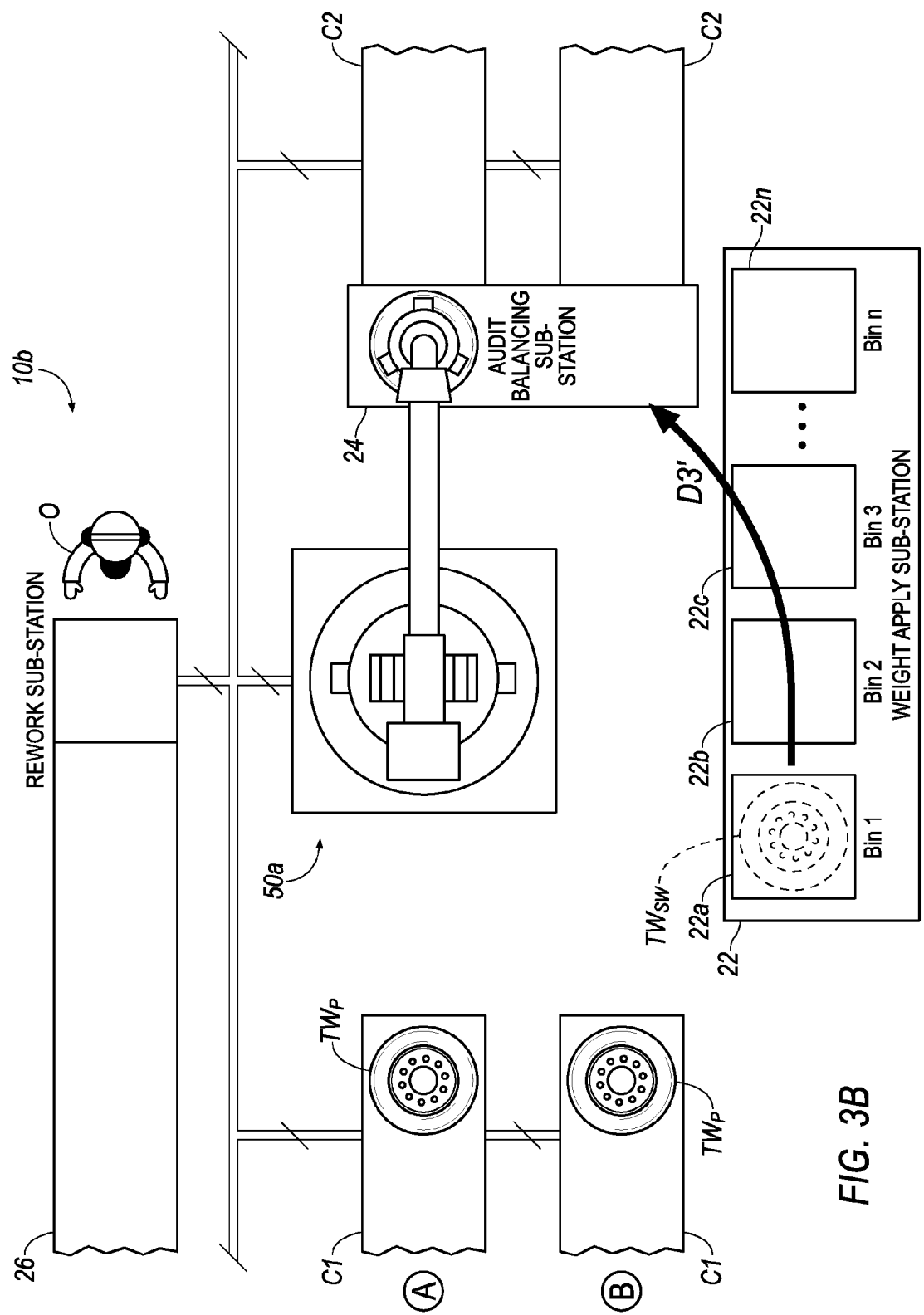

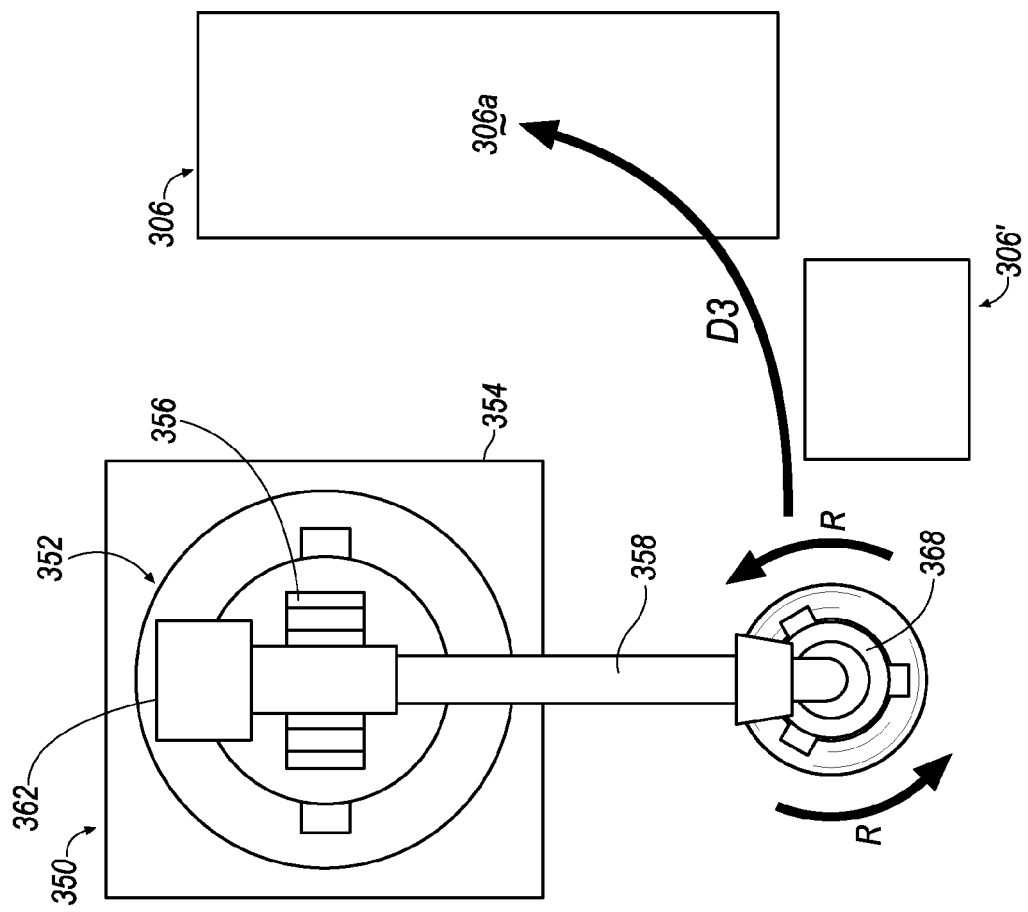
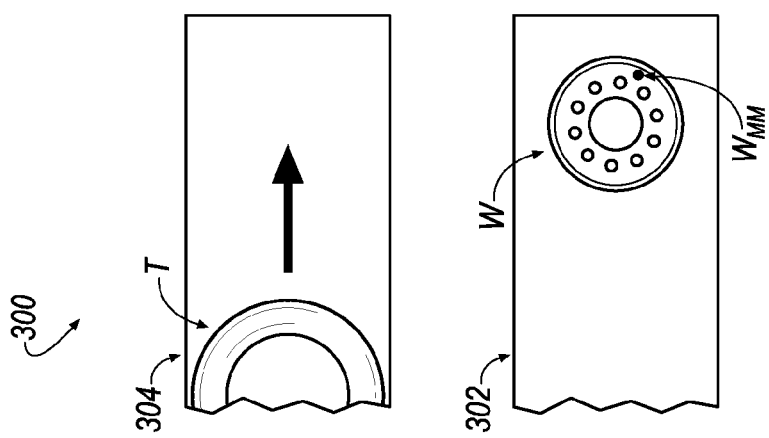
FIG. 8C

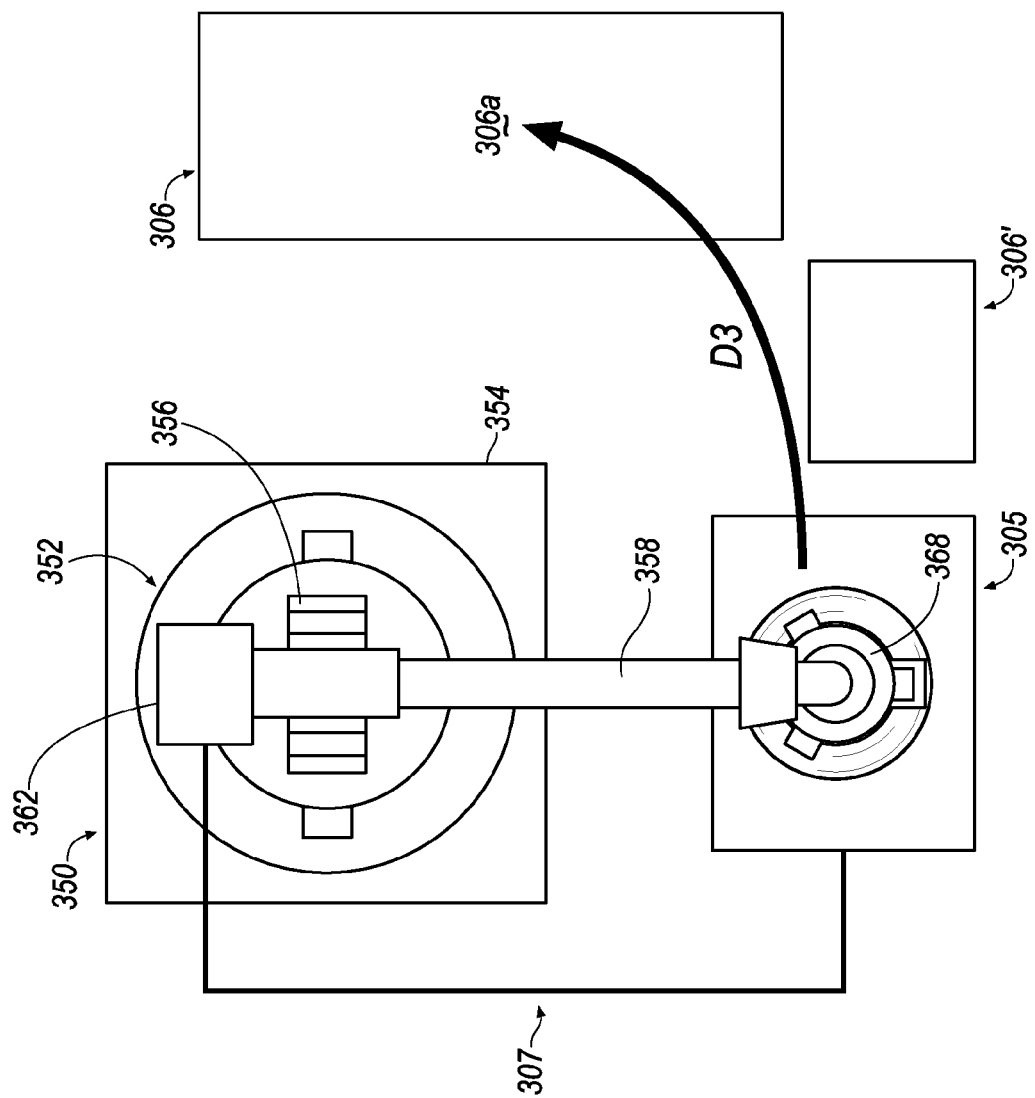
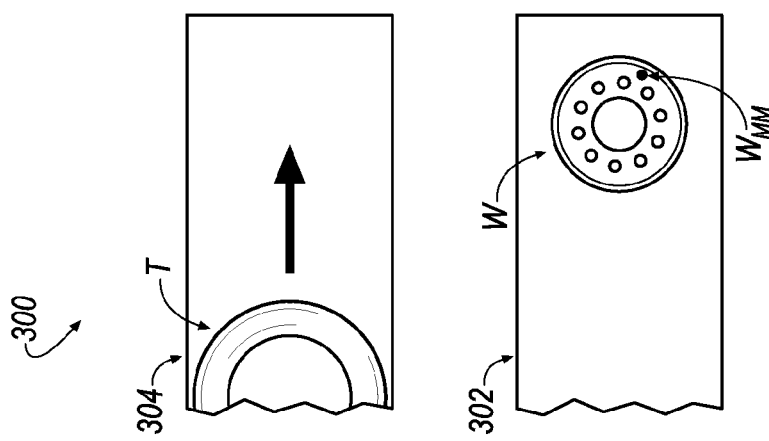
FIG. 8C'

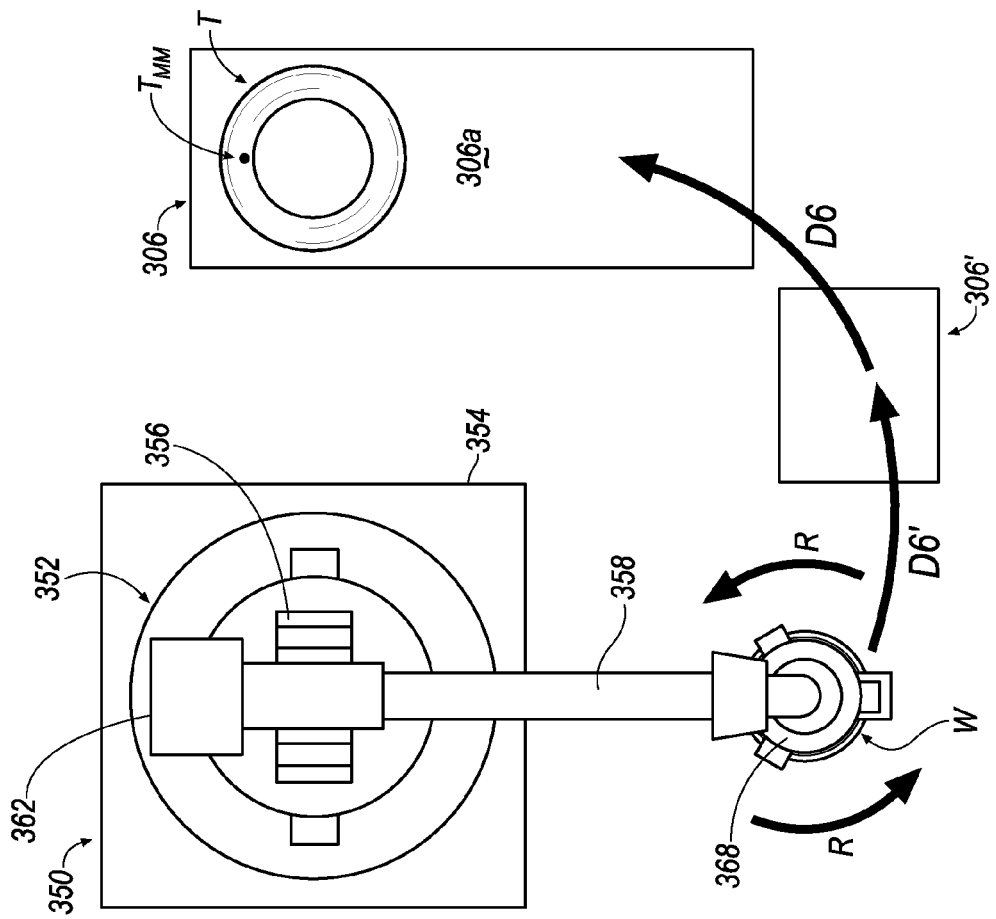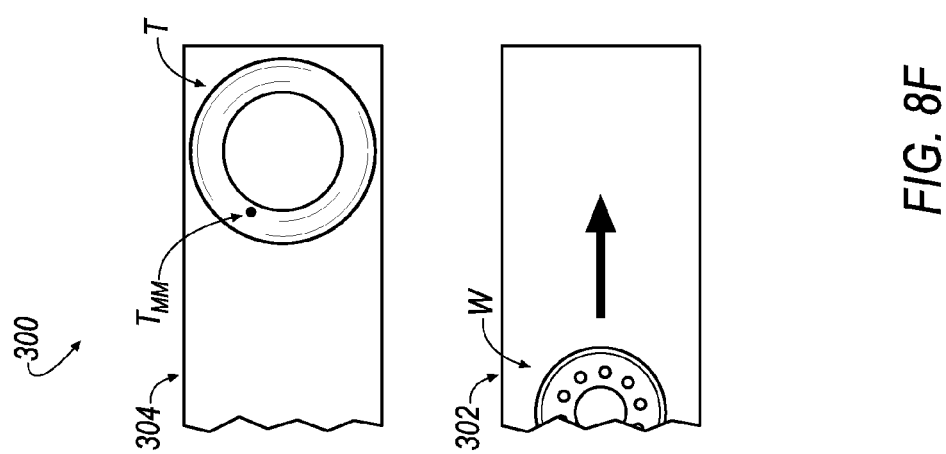
FIG. 8F

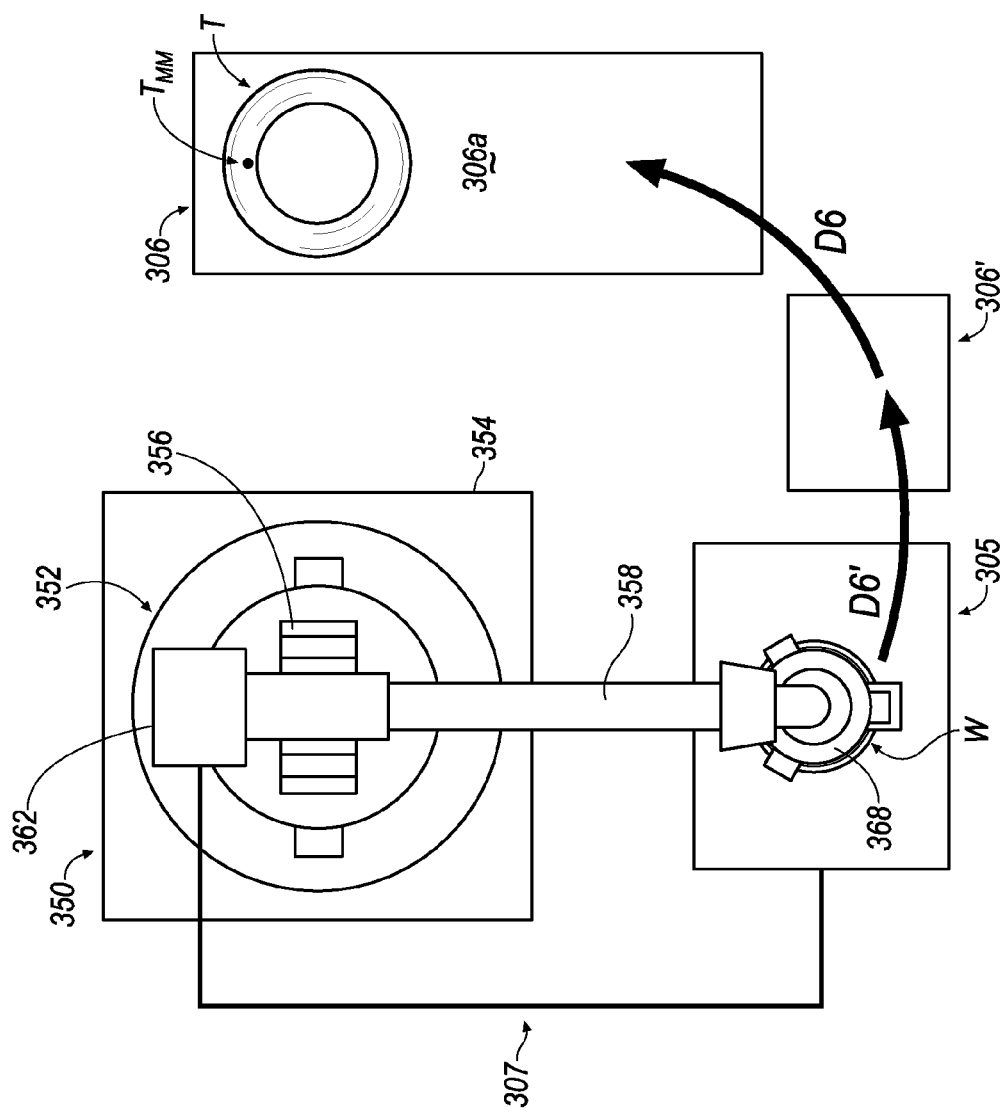
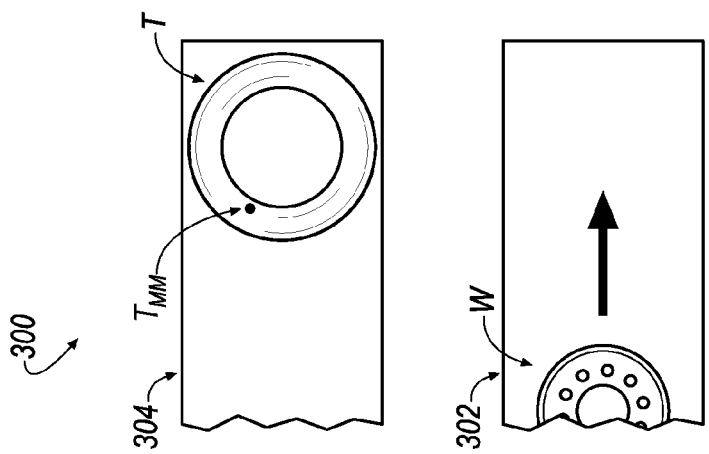
FIG. 8F'

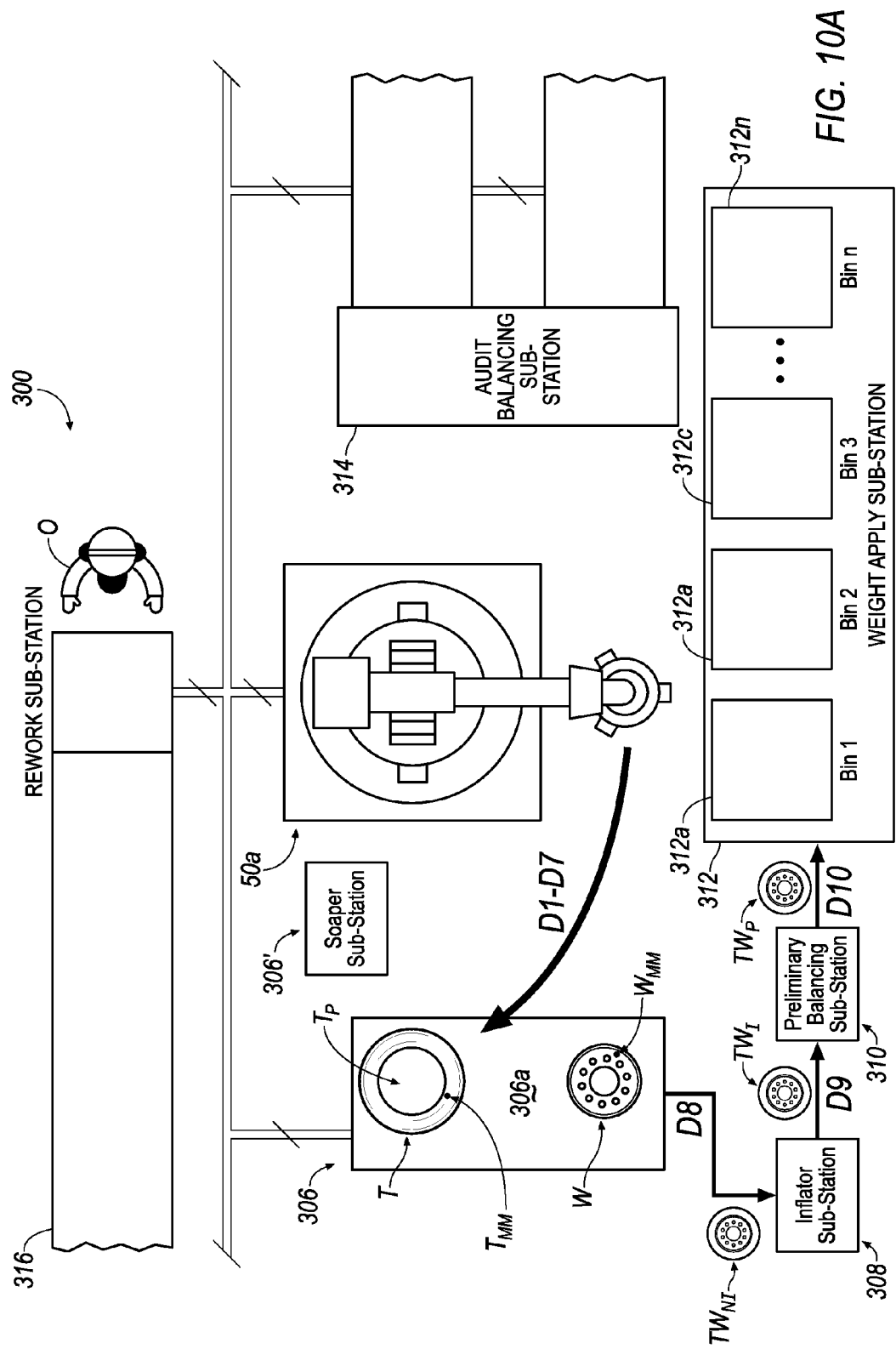

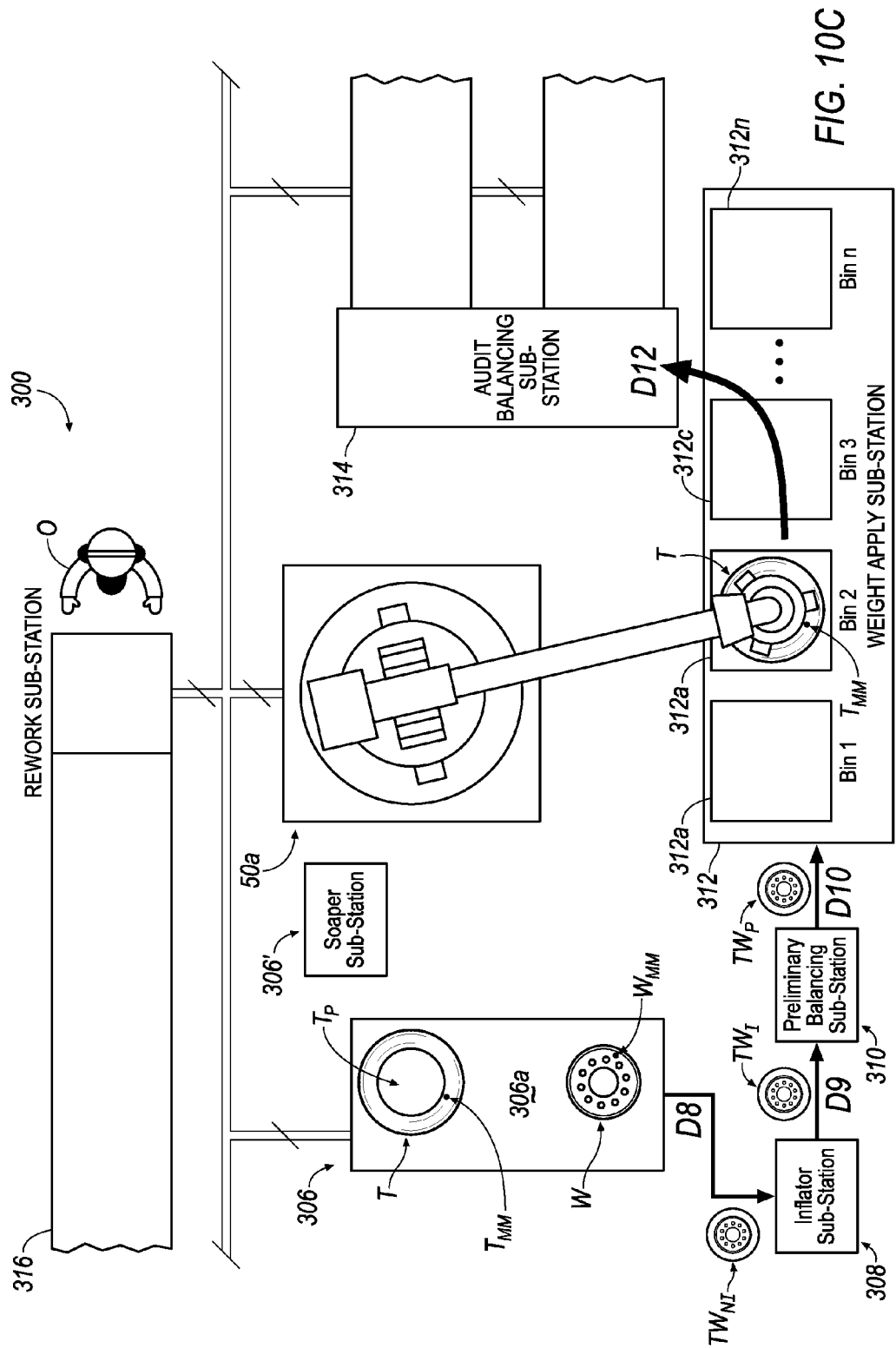

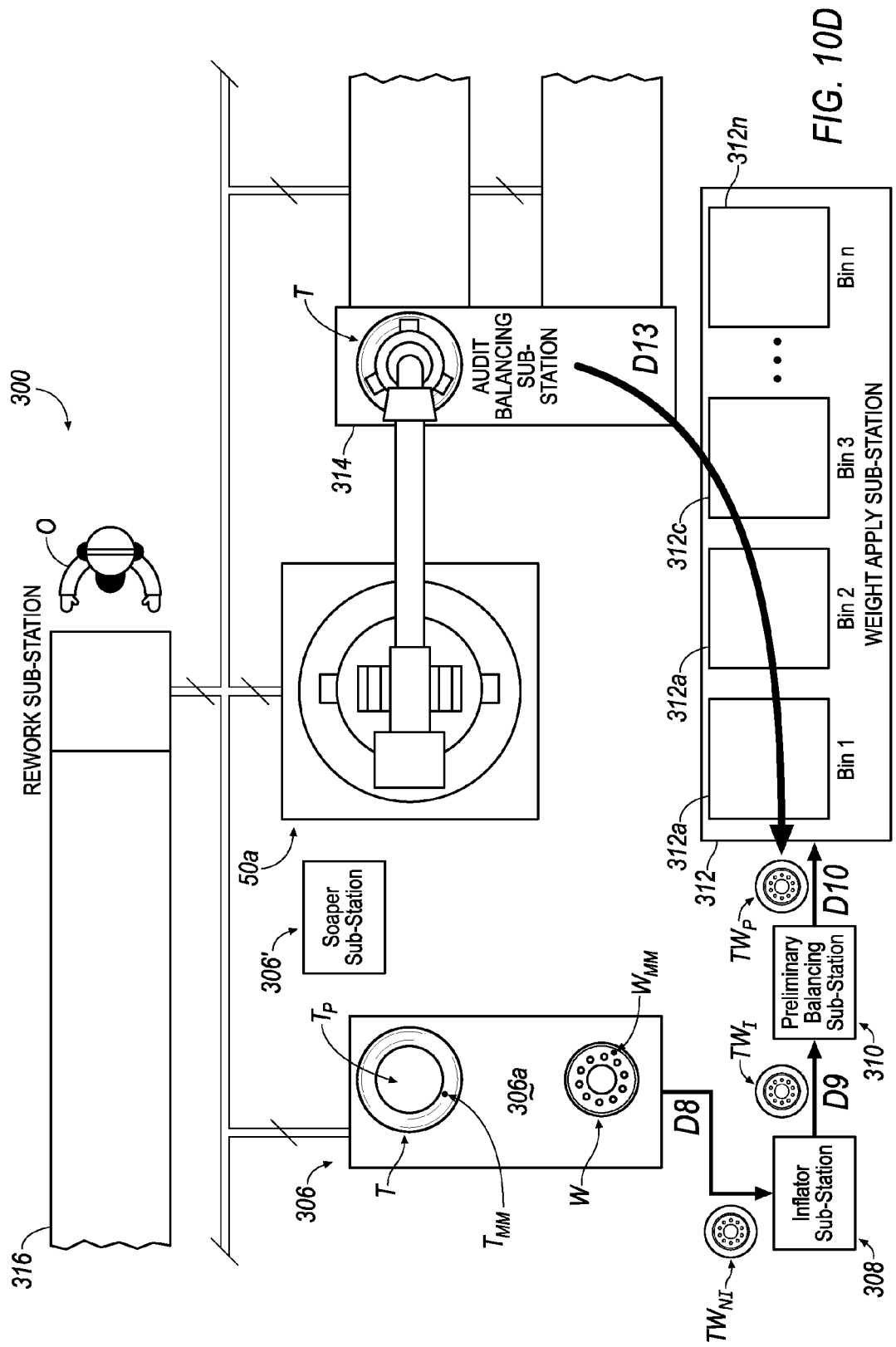

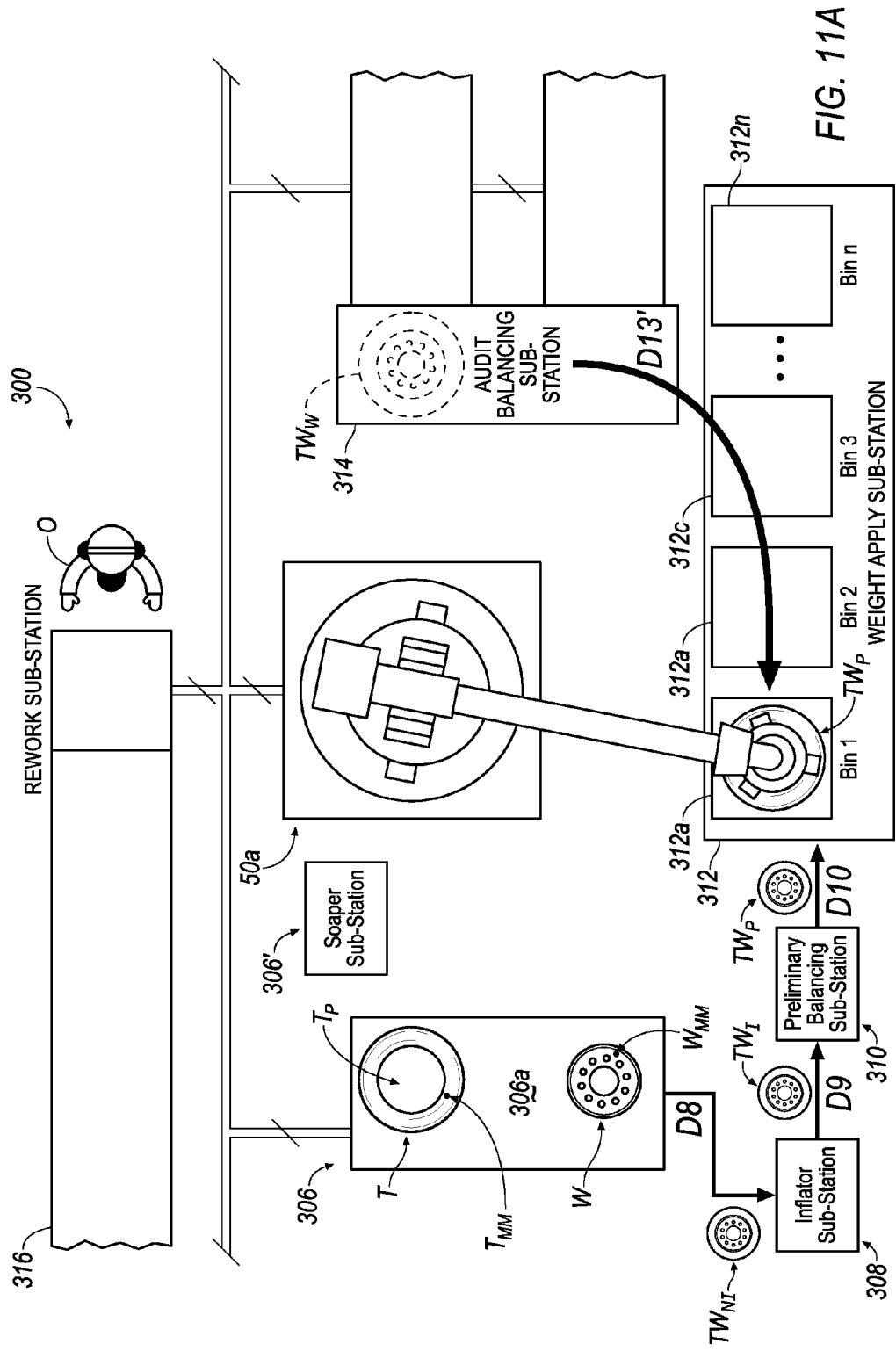

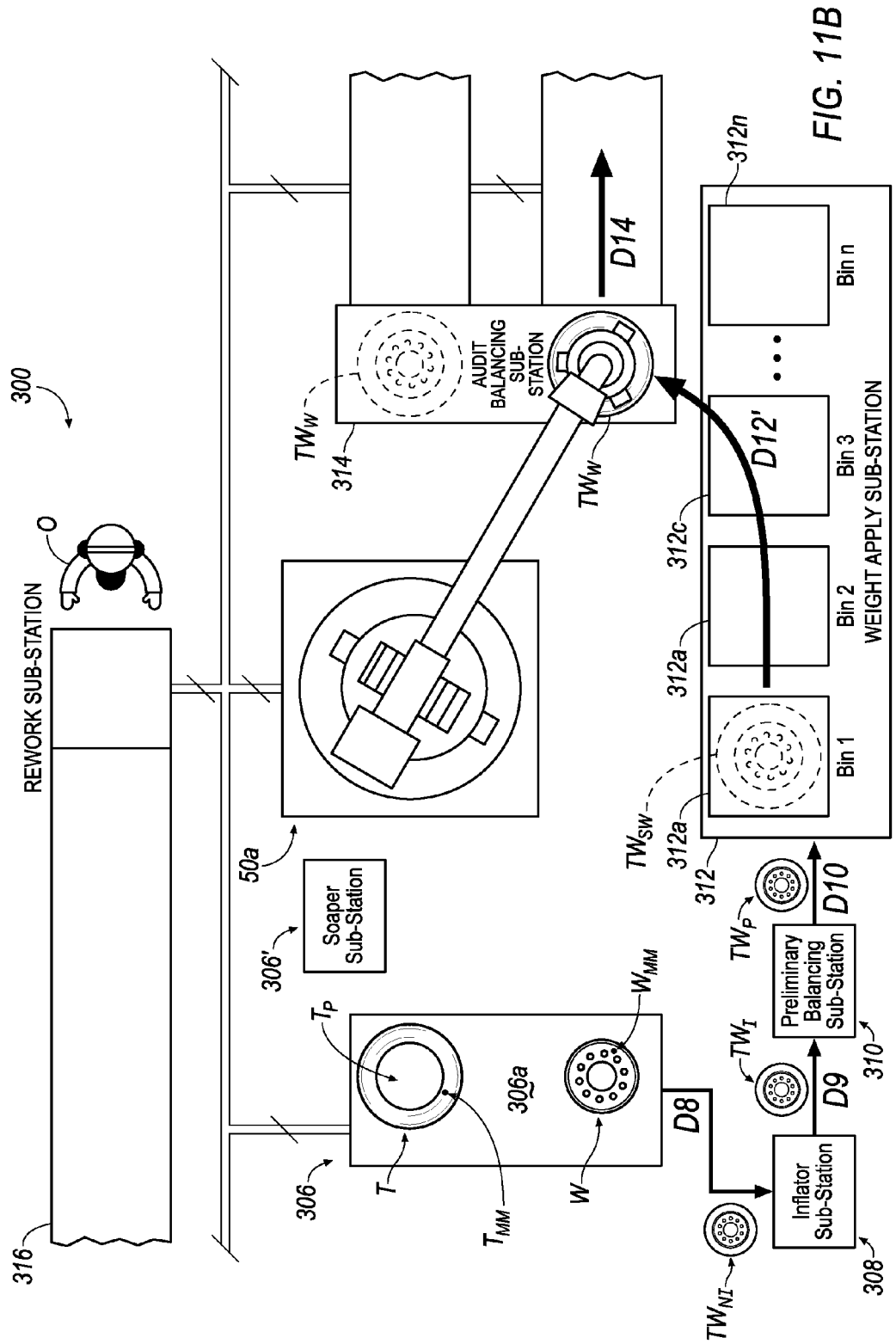

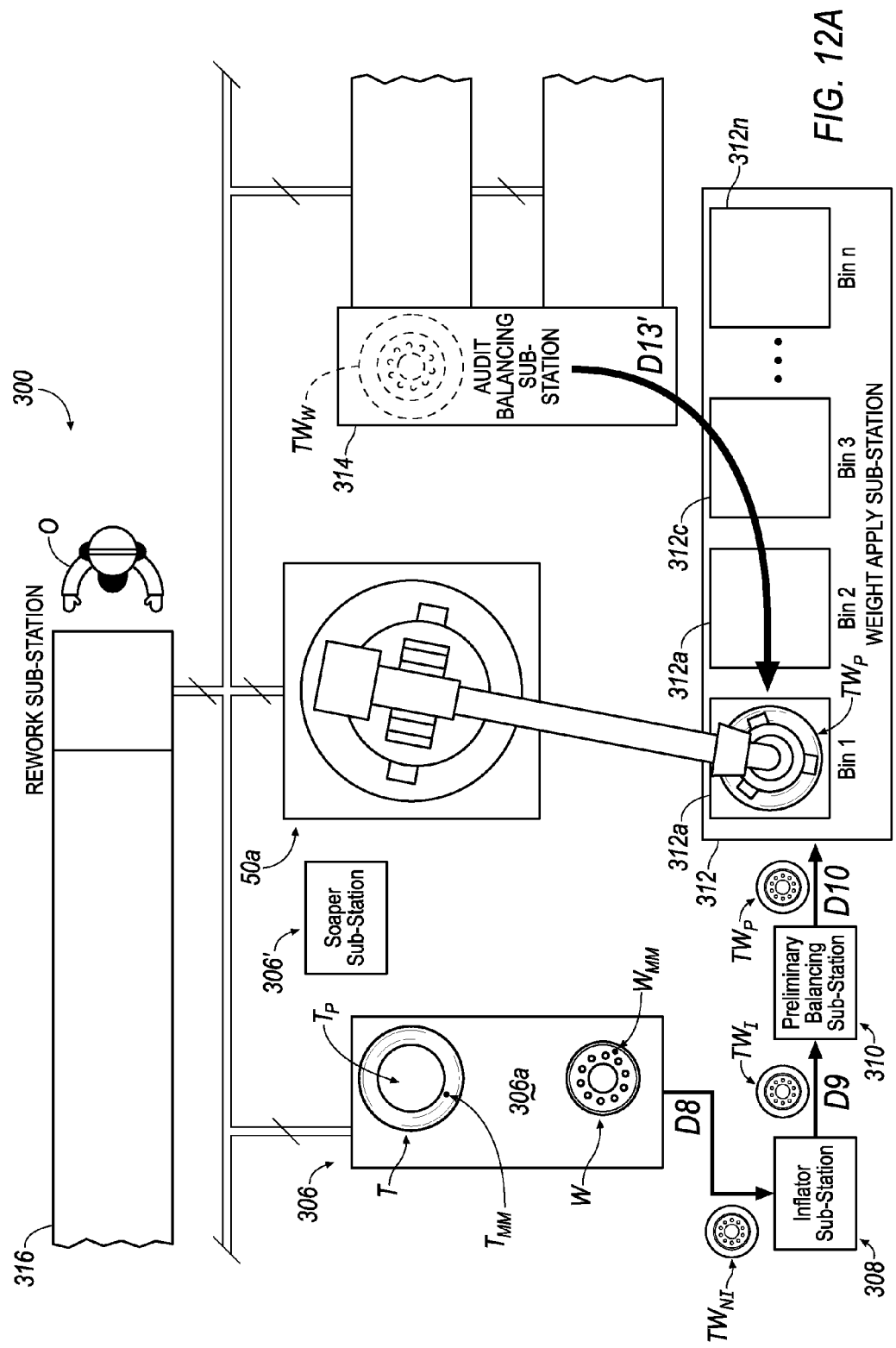

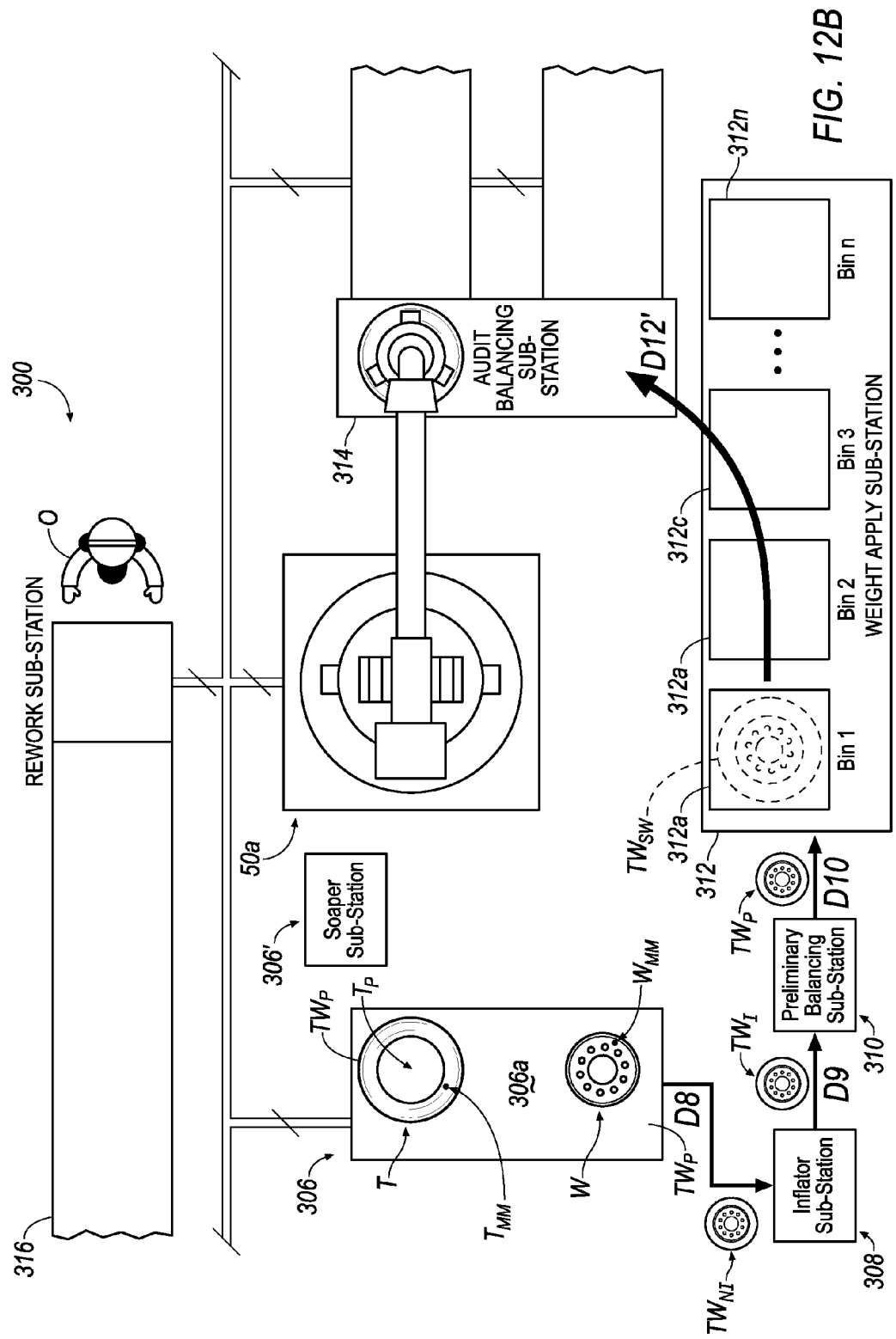

APPARATUS, SYSTEM AND METHOD FOR DETERMINING A SPATIAL LOCATION OF A MATCH-MARK REGION OF EACH OF A TIRE AND A WHEEL

CROSS-REFERENCE TO RELATED APPLICATIONS

This U.S. patent application is a continuation-in-part of U.S. Non-Provisional patent application Ser. No. 13/103,755 filed on May 9, 2011, which claims priority to U.S. Provisional Application: 61/332,869, filed on May 10, 2010, the disclosures of which are considered part of the disclosure of this application and are hereby incorporated by reference in its entirety.

FIELD OF THE INVENTION

The disclosure relates to tire-wheel assemblies and to a method and apparatus for processing a tire-wheel assembly.

DESCRIPTION OF THE RELATED ART

It is known in the art that a tire-wheel assembly is processed in several steps. Usually, conventional methodologies that conduct such steps require a significant capital investment and human oversight. The present invention overcomes drawbacks associated with the prior art by setting forth a device utilized for processing a tire-wheel assembly.

BRIEF DESCRIPTION OF THE DRAWINGS

The disclosure will now be described, by way of example, with reference to the accompanying drawings, in which:

FIGS. 3A-3D illustrates an apparatus and method for processing a tire-wheel assembly in accordance with an exemplary embodiment of the invention;

FIGS. 10A-10E illustrates an apparatus method for processing a tire-wheel assembly in accordance with an exemplary embodiment of the invention;

FIGS. 11A-11B illustrates an apparatus and method for processing a tire-wheel assembly in accordance with an exemplary embodiment of the invention;

FIGS. 12A-12D illustrates an apparatus and method for processing a tire-wheel assembly in accordance with an exemplary embodiment of the invention.

DETAILED DESCRIPTION OF THE INVENTION

The Figures illustrate an exemplary embodiment of an apparatus and method for processing a tire-wheel assembly in accordance with an embodiment of the invention. Based on the foregoing, it is to be generally understood that the nomenclature used herein is simply for convenience and the terms used to describe the invention should be given the broadest meaning by one of ordinary skill in the art.

In an embodiment, the apparatus shown generally at 10a, 10b, 100 and 200 in the Figures may be referred to as a "single-cell" workstation. In the forgoing disclosure, it will be appreciated that term "single-cell" indicates that the workstation 10a, 10b, 100 and 200 provides a tire-wheel assembly without requiring a plurality of successive, discrete workstations that may otherwise be arranged in a conventional assembly line. Rather, the single cell workstation 10a, 10b, 100 and 200 provides one workstation having a plurality of substations 12-26, each performing a specific task in the processing of a tire-wheel assembly. As such, the novel single-cell workstation 10a, 10b, 100 and 200 significantly reduces the cost, investment and maintenance associated with a conventional tire-wheel assembly line located on a relatively large real estate footprint. Thus, capital investment and human oversight is significantly reduced when a single cell workstation 10a, 10b, 100 and 200 is employed in the processing of tire-wheel assemblies.

Figure 6:
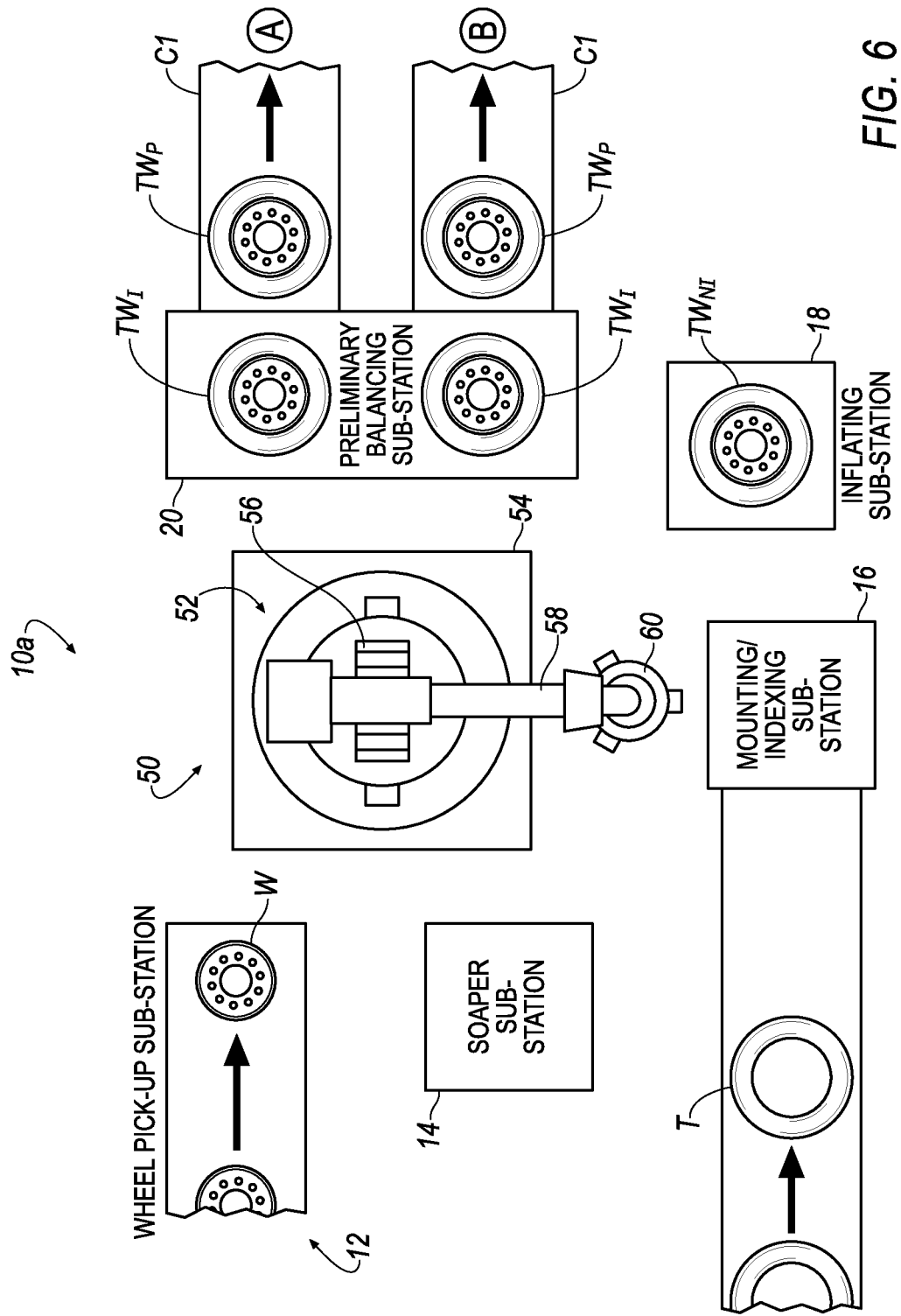
FIG. 6 illustrates a plan view of an apparatus and method for processing a tire-wheel assembly in accordance with an exemplary embodiment of the invention.
Figure 7:
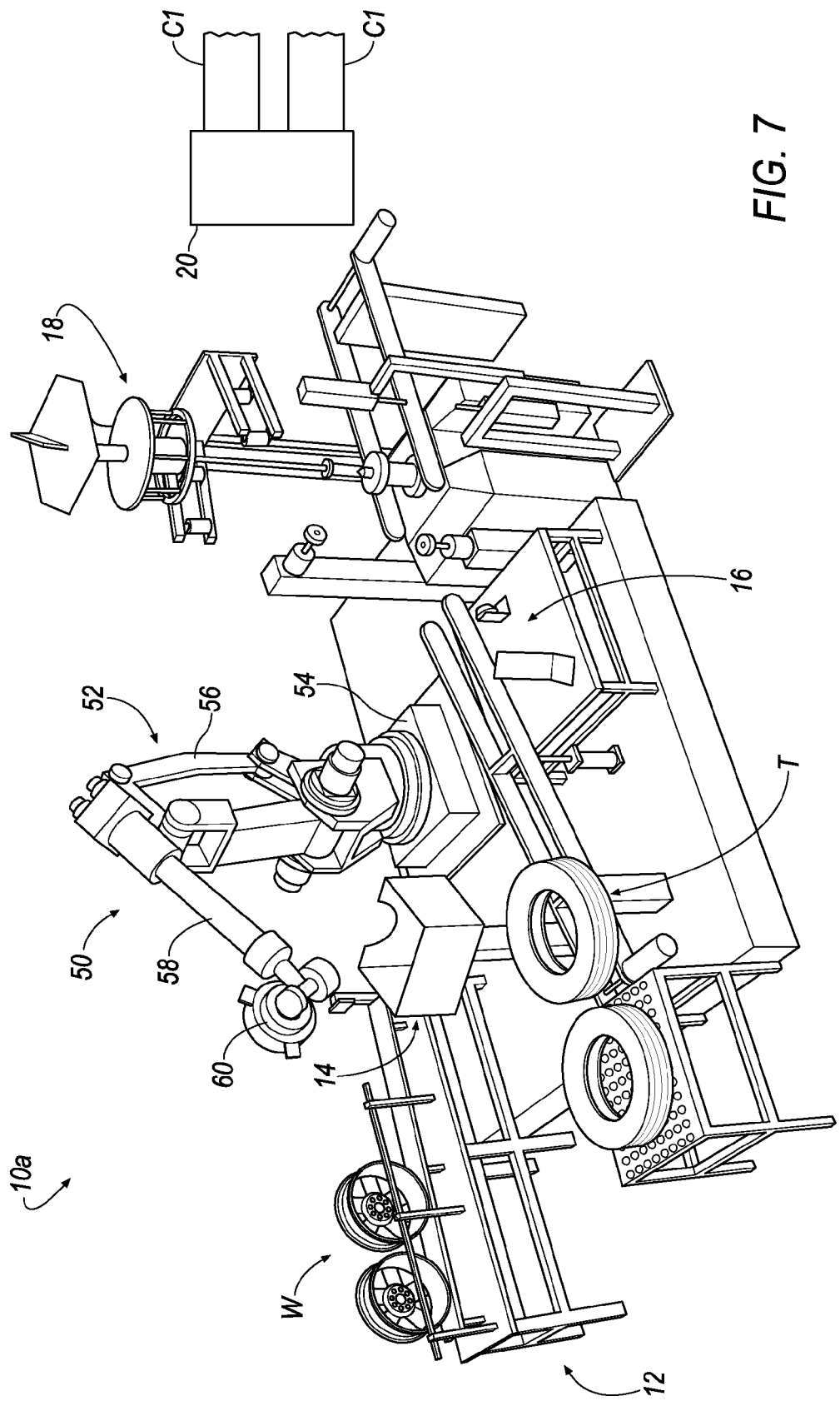
FIG. 7 illustrates a perspective view of the apparatus and method of FIG. 6 in accordance with an exemplary embodiment of the invention.

Referring initially to FIGS. 6-7, a single-cell workstation for processing a tire-wheel assembly is shown generally at 10a according to an embodiment. In an embodiment, the workstation 10a includes a device 50. In operation, the device 50 interfaces with a wheel, W, in order to prepare a preliminarily balanced tire-wheel assembly, $TW_P$. The ability of the device 50 to interface with the wheel, W, eliminates the need to "hand-off" one or more of a wheel, W, and tire, T, to a subsequent workstation of a plurality of workstations in a conventional assembly line.

In an embodiment, the device 50 associated with the single-cell workstation 10a may include a robotic arm 52 that may be located in a substantially central position relative a plurality of sub-stations. In an embodiment shown at FIGS. 6-7, a plurality of sub-stations is shown generally at 12-20.

In operation, a wheel, W, is removably-attached to the robotic arm 52. In an embodiment, the robotic arm 52 interfaces with the wheel, W, throughout some or all of the steps associated with the preparation of the preliminarily balanced tire-wheel assembly, $TW_P$. In an embodiment, the robotic arm 52 may include, for example, a base portion 54, a body portion 56 connected to the base portion 54, an arm portion 58 connected to the body portion 56, and a claw portion 60 connected to the arm portion 58.

In an embodiment, the body portion 56 is rotatably-connected to the base portion 54 such that the body portion 56 may be pivoted 360° relative the base portion 54. Further, in an embodiment, the body portion 56 may be generally hinged to the base portion 54 having, for example, hinged, scissor-style arms such that the body portion 56 may be articulated vertically upward or downward relative the base portion 54.

In an embodiment, the arm portion 58 may be connected to the body portion 56 such that the arm portion 58 may be articulated in any desirable upward or downward position relative the body portion 56. Similar to the rotatable connection of the base portion 54 and body portion 56, the claw portion 60 may be rotatably-connected to the arm portion 58 such that the claw portion 60 may be rotated, pivoted or otherwise spun 360° relative the arm portion 58; as will be described in the foregoing disclosure as related to FIG. 5, the claw portion 60 may be spun relative the arm portion 58 at a relatively high rate of speed in order to conduct a balancing operation of the wheel, W, and tire, T. In an embodiment, movement of the portions 54-60 may be controlled manually with a joystick (not shown), or, alternatively, automatically by way of logic stored on a controller having a processor (not shown).

In the following description, it will be appreciated that prescribed movements of the body portion 56 relative the base portion 54 may have occurred before, during or after movement of the arm portion 58 and/or claw portion 60. For example, the body portion 56 may have been rotated, articulated or the like in order to locate the arm and claw portions 58, 60 to a desired position at or proximate a particular sub-station.

Regarding the general movement of the device 50 relative the sub-stations 12-20, in an embodiment, the robotic arm 52 is manipulated such that it 1) obtains a wheel, W, at a wheel repository sub-station 12, 2) soaps the wheel, W, at a soaping sub-station 14, 3) mounts the wheel, W, to a tire, T, at a mounting/indexing sub-station 16 to define a non-inflated tire-wheel assembly, $TW_{NI}$, 4) locates the non-inflated tire-wheel assembly, $TW_{NI}$, at an inflating sub-station 18 for inflating the non-inflated tire-wheel assembly, $TW_{NI}$, and 5) locates the inflated tire-wheel assembly, $TW_I$, at a preliminary balancing sub-station 20 for preliminarily balancing the inflated tire-wheel assembly, $TW_I$, to define a preliminarily balanced tire-wheel assembly, $TW_P$.

After being preliminarily balanced, the preliminarily balanced tire-wheel assembly, $TW_P$, is located on a conveyor or similar mechanism, which is shown generally at C1. In an embodiment, the conveyor, C1, may extend from, or, alternatively be located proximate the preliminary balancing sub-station 20. As illustrated, more than one conveyor, C1, may be included to permit receipt of rapidly mass produced preliminarily balanced tire-wheel assemblies, $TW_P$.

Figure 1A:
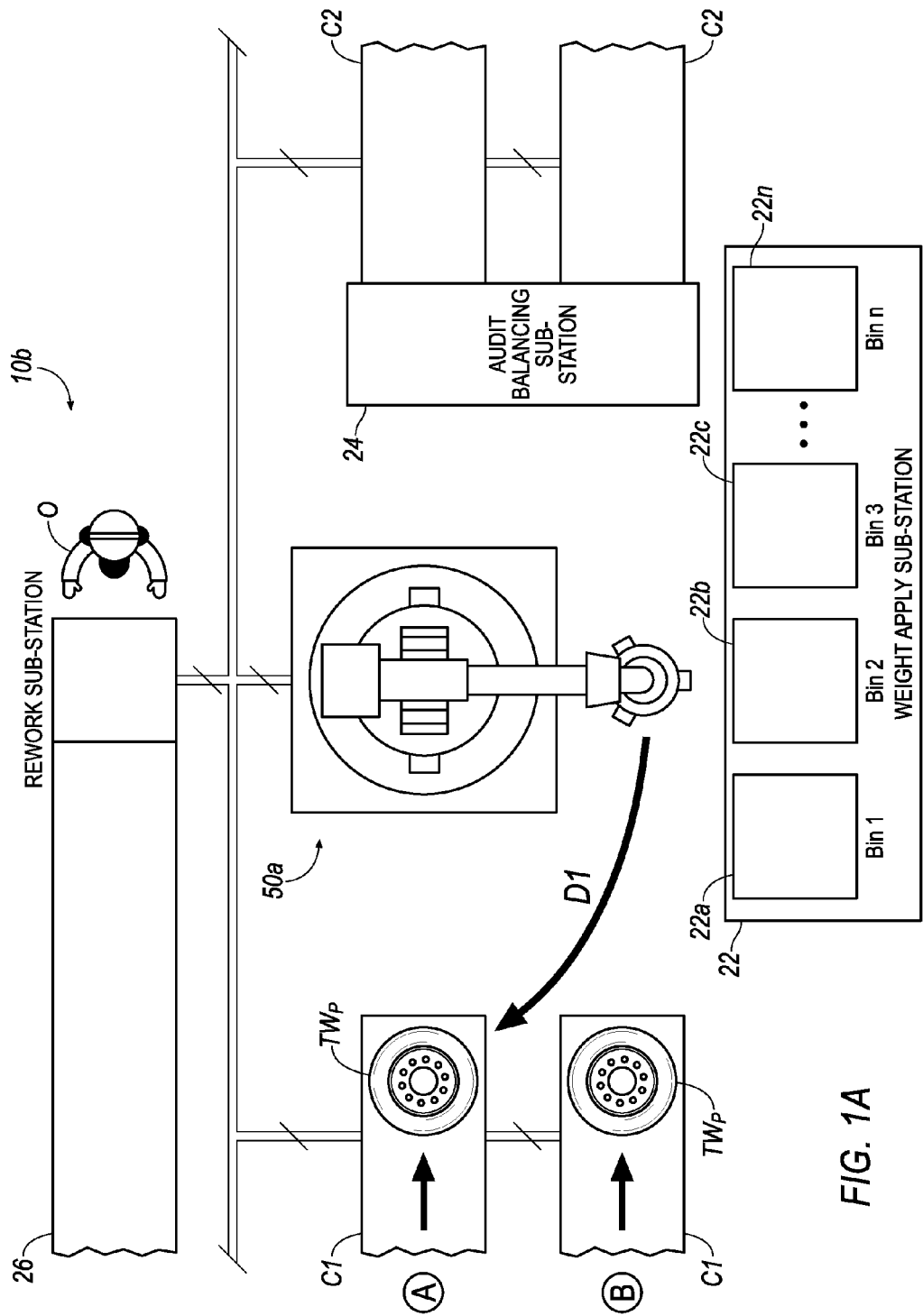
FIGS. 1A-1E illustrates an apparatus method for processing a tire-wheel assembly in accordance with an exemplary embodiment of the invention.

Referring now to FIG. 1A, a single-cell workstation for processing a tire-wheel assembly, is shown generally at 10b according to an embodiment. In an embodiment, the single-cell workstation 10b includes a device, which is shown generally at 50a. The device 50a may be substantially similar to the device 50 shown and described in FIGS. 6-7.

Figure 1B:
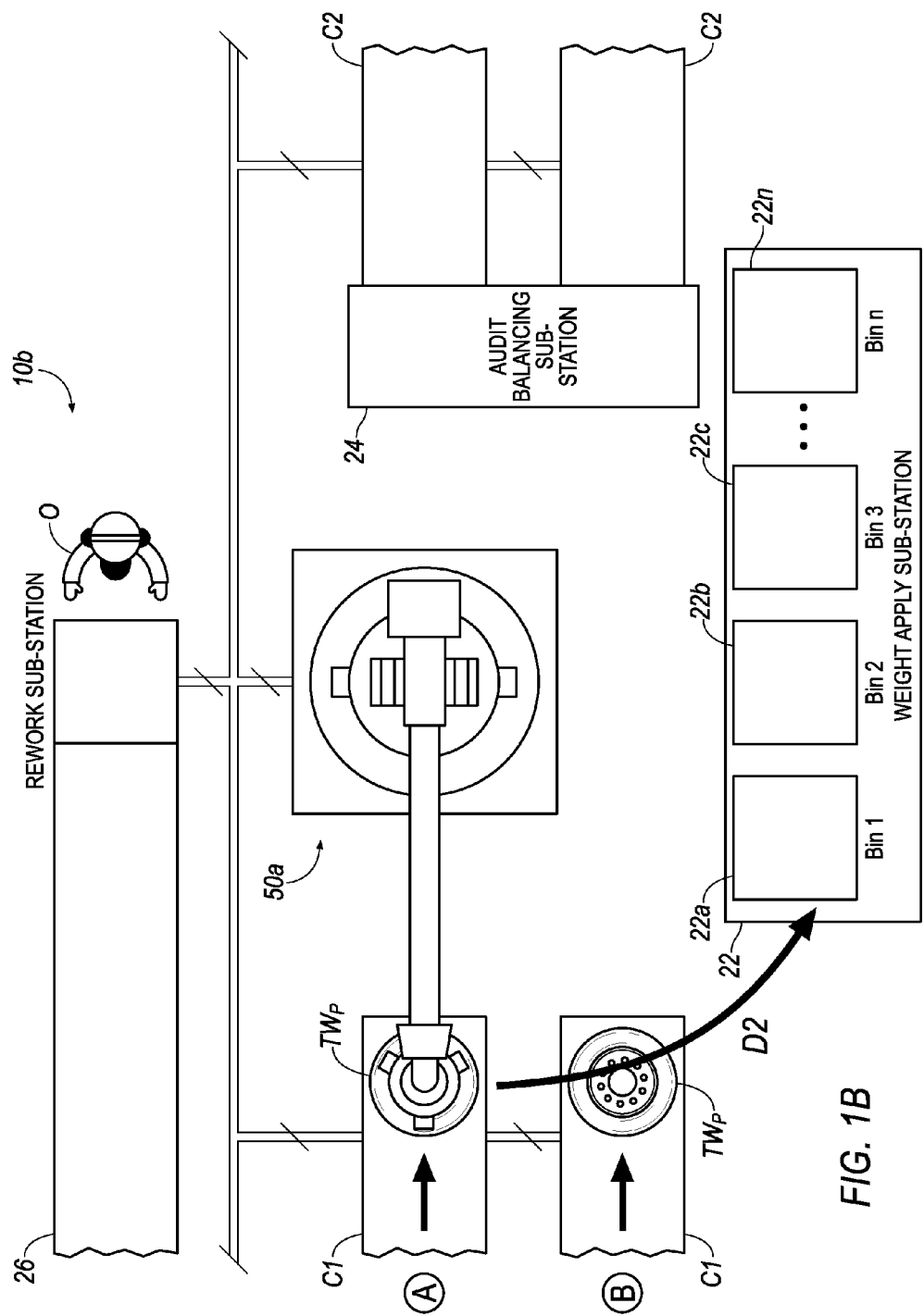

Initially, the device 50a retrieves the preliminarily balanced tire-wheel assembly, $TW_P$, from the conveyor, C1. According to an embodiment, the device 50a may move from an at-rest position toward the conveyor, C1, generally in the direction of arrow, D1, in order to retrieve the preliminarily balanced tire-wheel assembly, $TW_P$. Then, as seen in FIG. 1B, the device 50a retrieves and moves the preliminarily balanced tire-wheel assembly, $TW_P$, to a weight applicator sub-station 22 according to the direction of arrow, D2.

In an embodiment, one or more of the device 50a and weight applicator sub-station 22 may determine, or, alternatively, be provided with weight application information for the preliminarily balanced tire-wheel assembly, $TW_P$. In an embodiment, the weight application information may be communicated wirelessly, or, alternatively, over a hard-wire connection from the preliminary balancing sub-station 20 to one or more of the device 50a and weight application sub-station 22. In an embodiment, rather than communicating the weight application information, the weight application information may be printed on the preliminarily balanced tire-wheel assembly, $TW_P$. In an embodiment, the information may be printed on the preliminarily balanced tire-wheel assembly, $TW_P$, in the form of a bar code that is read by one or more of the device 50a and weight application sub-station 22.

In an embodiment, the weight application information may include a value of weight that is to be added to the preliminarily balanced tire-wheel assembly, $TW_P$. In an embodiment, the weight application information may also include the location on the preliminarily balanced tire-wheel assembly, $TW_P$, where the value of the weight is to be applied. In an embodiment, the weight may be applied to the preliminarily balanced tire-wheel assembly, $TW_P$, at any desirable location including, for example, a rim of the wheel, W. In an embodiment, the weight may be clipped to, or, alternatively, adhered to the wheel, W.

As such, when the device 50a moves the preliminarily balanced tire-wheel assembly, $TW_P$, from the conveyor, C1, to the weight applicator sub-station 22, the provided or determined weight application information may correlate to one or more unique weights that may be retrieved from one or more of a plurality of bins 22a-22n located at the weight applicator sub-station 22. In an embodiment, each of the bins 22a-22n may each contain a plurality of weights. In an embodiment, each bin 22a-22n includes a plurality of weights having a similar value; accordingly, in an embodiment, bin 22a may include a plurality of ⅛ ounce weights, bin 22b may include a plurality of ¼ ounce weights, bin 22c may include a plurality of ½ ounce weights, etc. In an embodiment the weights may include one or more of a clip and adhesive for attachment to, for example, the wheel, W.

It will be appreciated, however, that the weight applicator sub-station 22 is not limited to include a plurality of bins 22a-22n nor a plurality of weights having different values. In an embodiment, for example, the weight applicator sub-station 22 may include a device that manufactures a weight to a specific value that is provided from the weight application information. For example, in an embodiment, the weight applicator sub-station 22 may include a plurality of weighted slugs having a value of x-ounces; then, upon learning the weight application information, a portion of one of the weighted slugs may be cut, fractured, or otherwise separated to define a slug shard having a weight value that is called for by the weight application information. In an embodiment, the slug shard may include one or more of a clip and adhesive for attachment to, for example, the wheel, W.

Figure 1C:
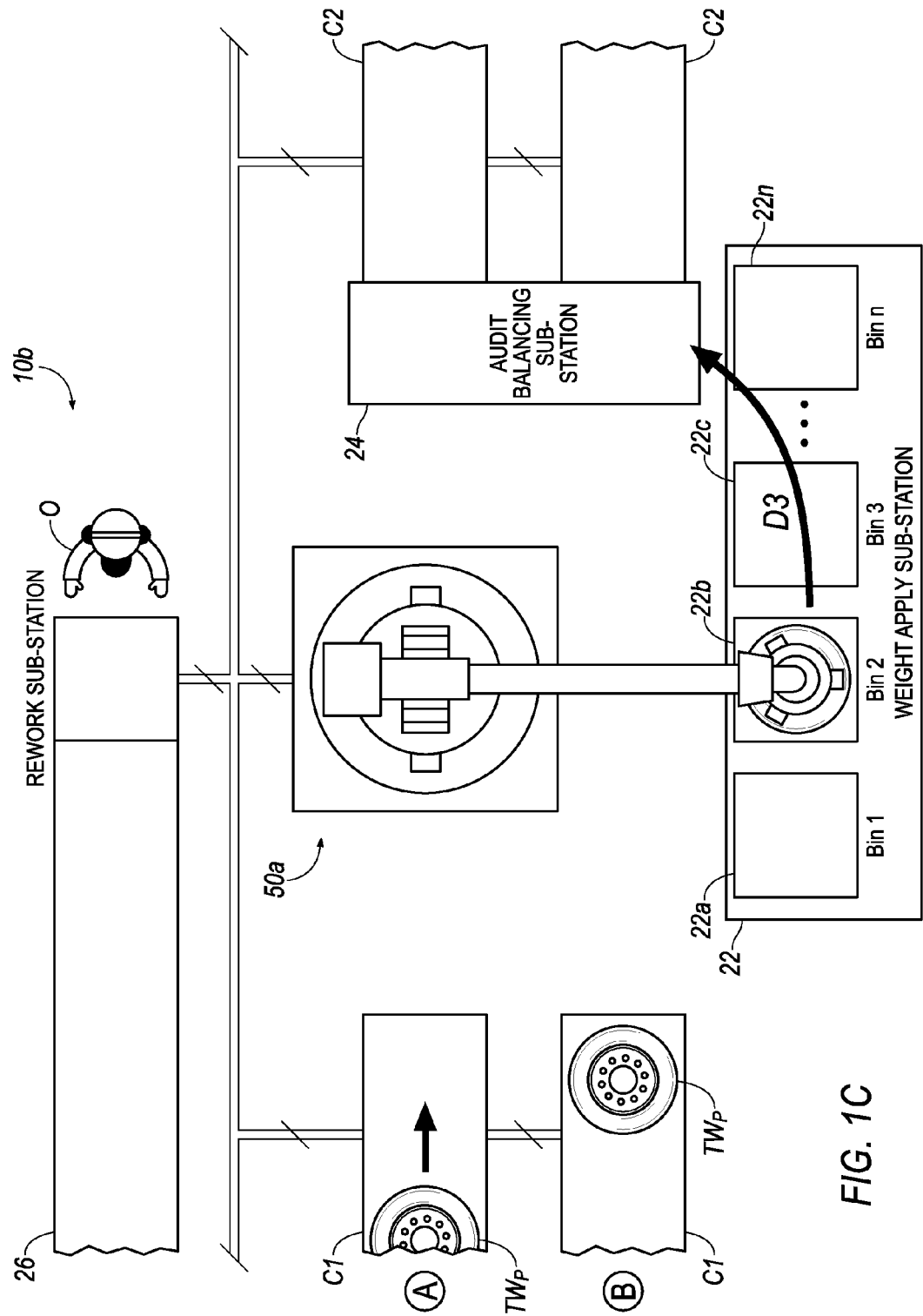

Referring to FIG. 1C, once the one or more weights are retrieved from the one or more bins 22a-22n and applied to the preliminarily balanced tire-wheel assembly, $TW_P$, the preliminarily balanced tire-wheel assembly, $TW_P$, may be referred to as a weighted tire-wheel assembly, $TW_W$. The device 50a then moves the weighted tire-wheel assembly, $TW_W$, to an audit balancing sub-station 24 according to the direction of the arrow, D3. Once received at the audit balancing sub-station 24, the audit balancing sub-station 24 determines if the one or more weights applied to the preliminarily balanced tire-wheel assembly, $TW_P$, at the weight applicator sub-station 22 has corrected the imbalance of the inflated tire-wheel assembly, $TW_I$, as determined by the preliminary balancing sub-station 20.

Figure 1D:
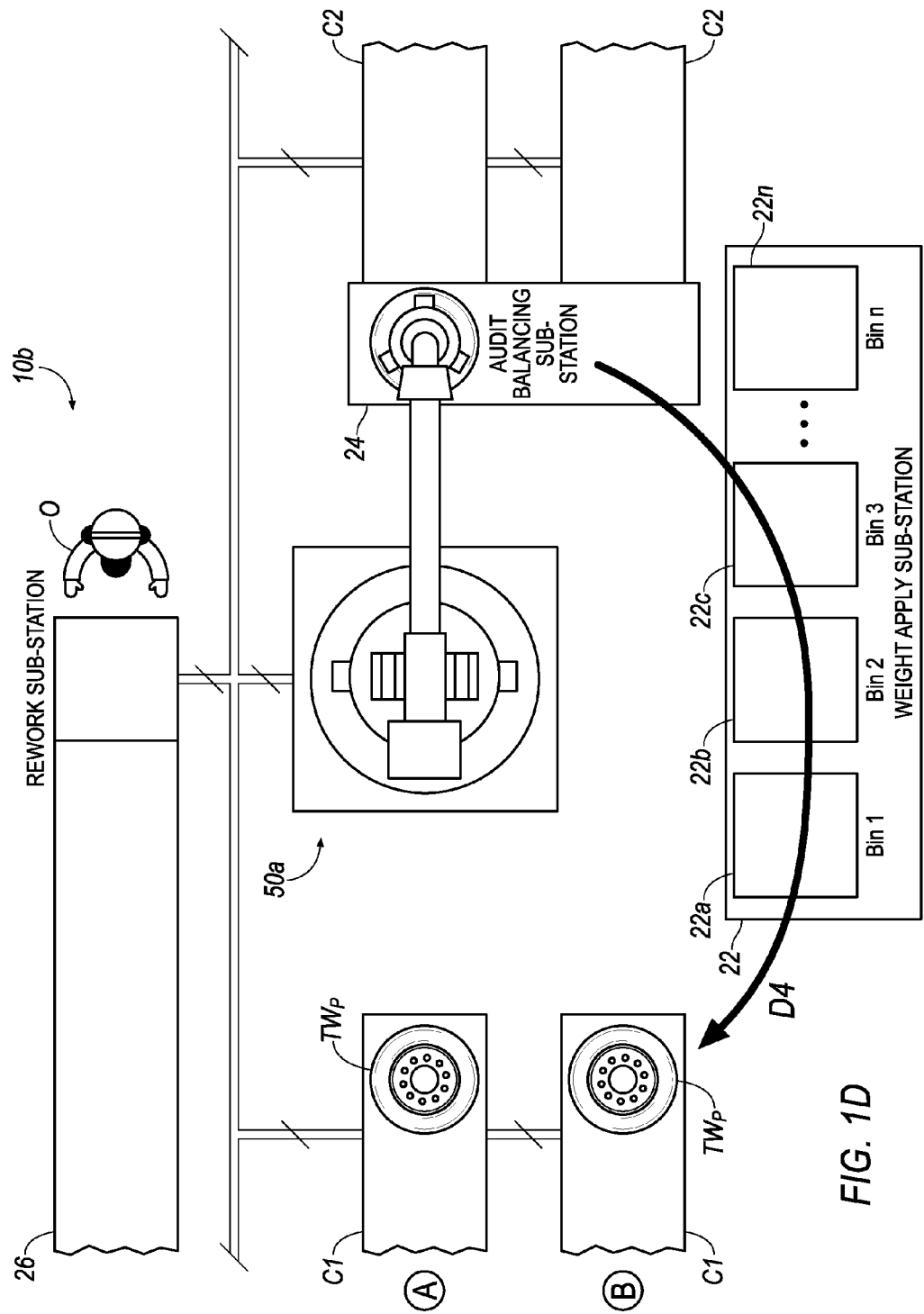
Figure 1E:
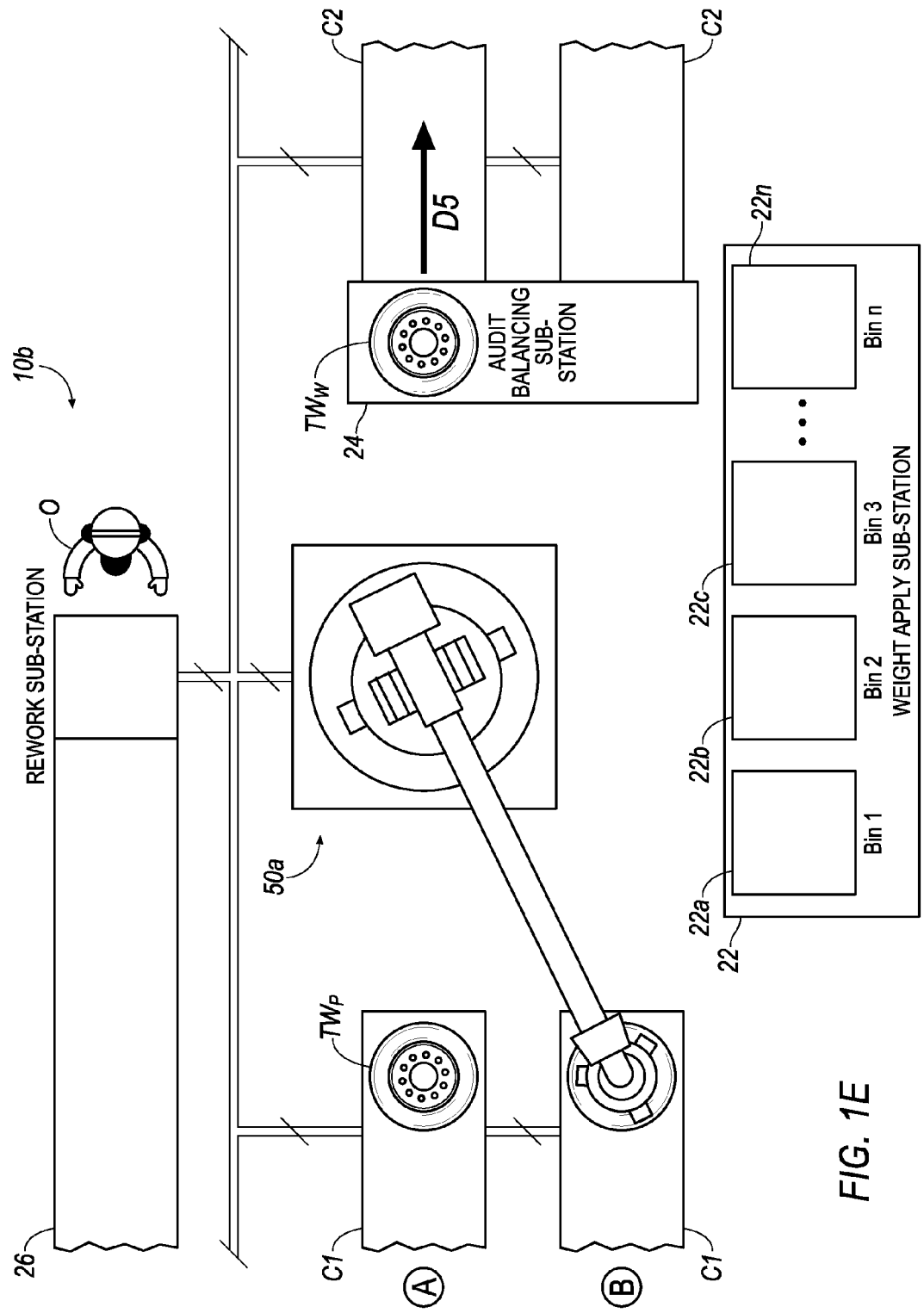

As seen in FIG. 1D, the device 50a may be returned to a position proximate the conveyor, C1, according to the direction of arrow, D4, in order to move another preliminarily balanced tire-wheel assembly, $TW_P$, to the weight applicator sub-station 22. As seen in FIG. 1E, during or after the movement of the device 50a in the direction of arrow, D4, the weighted tire-wheel assembly, $TW_W$, located at the audit balancing sub-station 24 may be discharged onto a discharging device, conveyor, or the like, which is shown generally at C2, for movement in the direction according to arrow, D5.

Figure 2A:
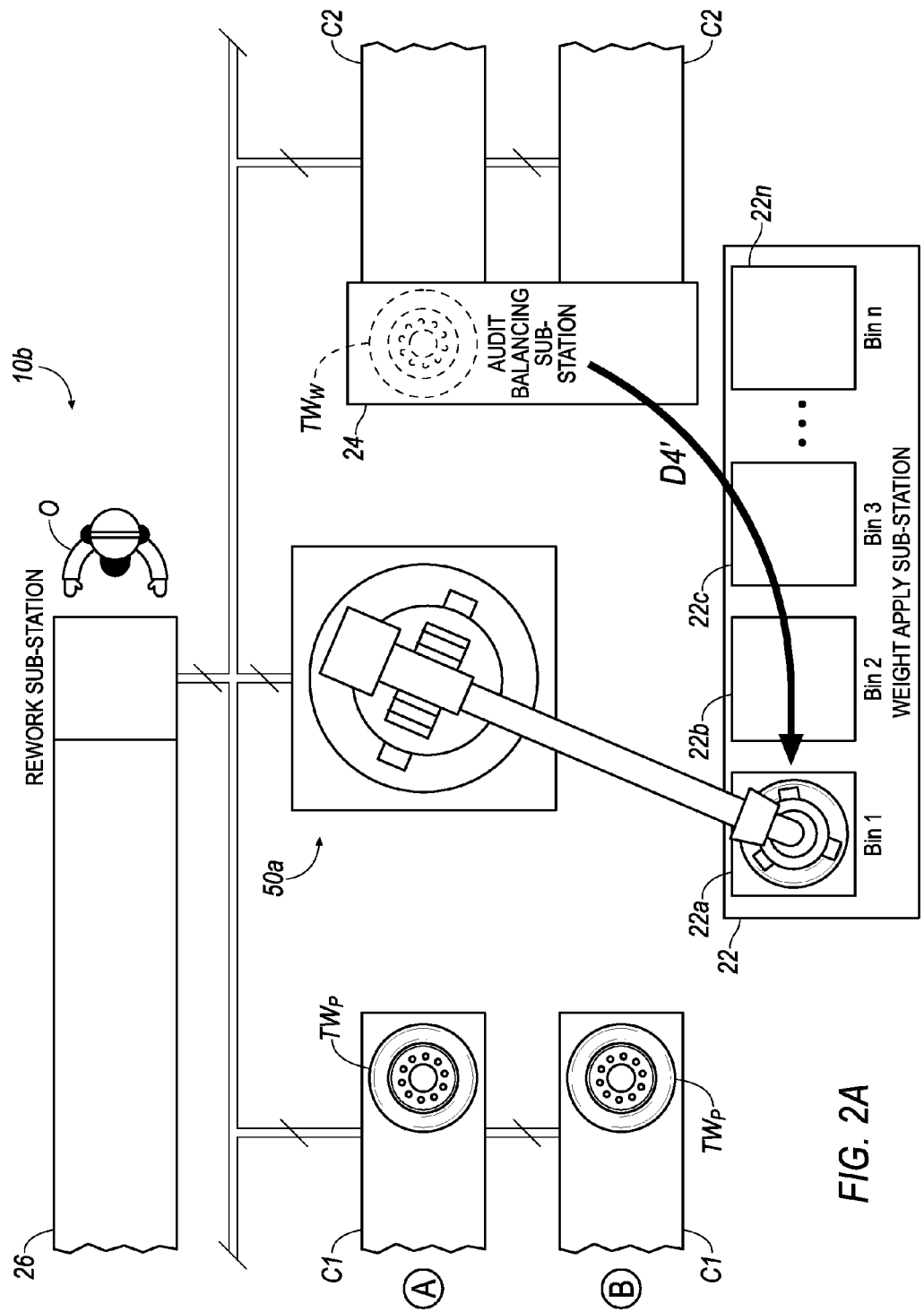
FIGS. 2A-2B illustrates an apparatus and method for processing a tire-wheel assembly in accordance with an exemplary embodiment of the invention.

It will be appreciated that the weighted tire-wheel assembly, $TW_W$, may be discharged in the direction of arrow, D5, from the audit balancing sub-station 24 if the audit balancing sub-station 24 has determined that the one or more weights applied to the preliminarily balanced tire-wheel assembly, $TW_P$, at the weight applicator sub-station 22 resulted in the cancellation of any imbalance to the inflated tire-wheel assembly, $TW_I$. Alternatively, as seen in FIG. 2A, if, for example, the audit balancing sub-station 24 has determined that the weighted tire-wheel assembly, $TW_W$, remains imbalanced, the device 50a may retrieve the weighted tire-wheel assembly, $TW_W$, from the audit balancing sub-station 24 for movement of the weighted tire-wheel assembly, $TW_W$, from the audit balancing sub-station 24 back to the weight applicator sub-station 22 according to the direction of arrow, D4'.

If, for example, the device 50a moves the weighted tire-wheel assembly, $TW_W$, according to the direction of arrow, D4', the audit balancing sub-station 24 may provide supplemental weight application information (e.g., wirelessly and/or hardwired as similarly described above) to, for example, the device 50a/weight applicator sub-station 22, or, alternatively, the audit balancing sub-station 24 may print the supplemental weight application information on the weighted tire-wheel assembly, $TW_W$, for further use by the device 50a or weight applicator sub-station 22.

Figure 2B:
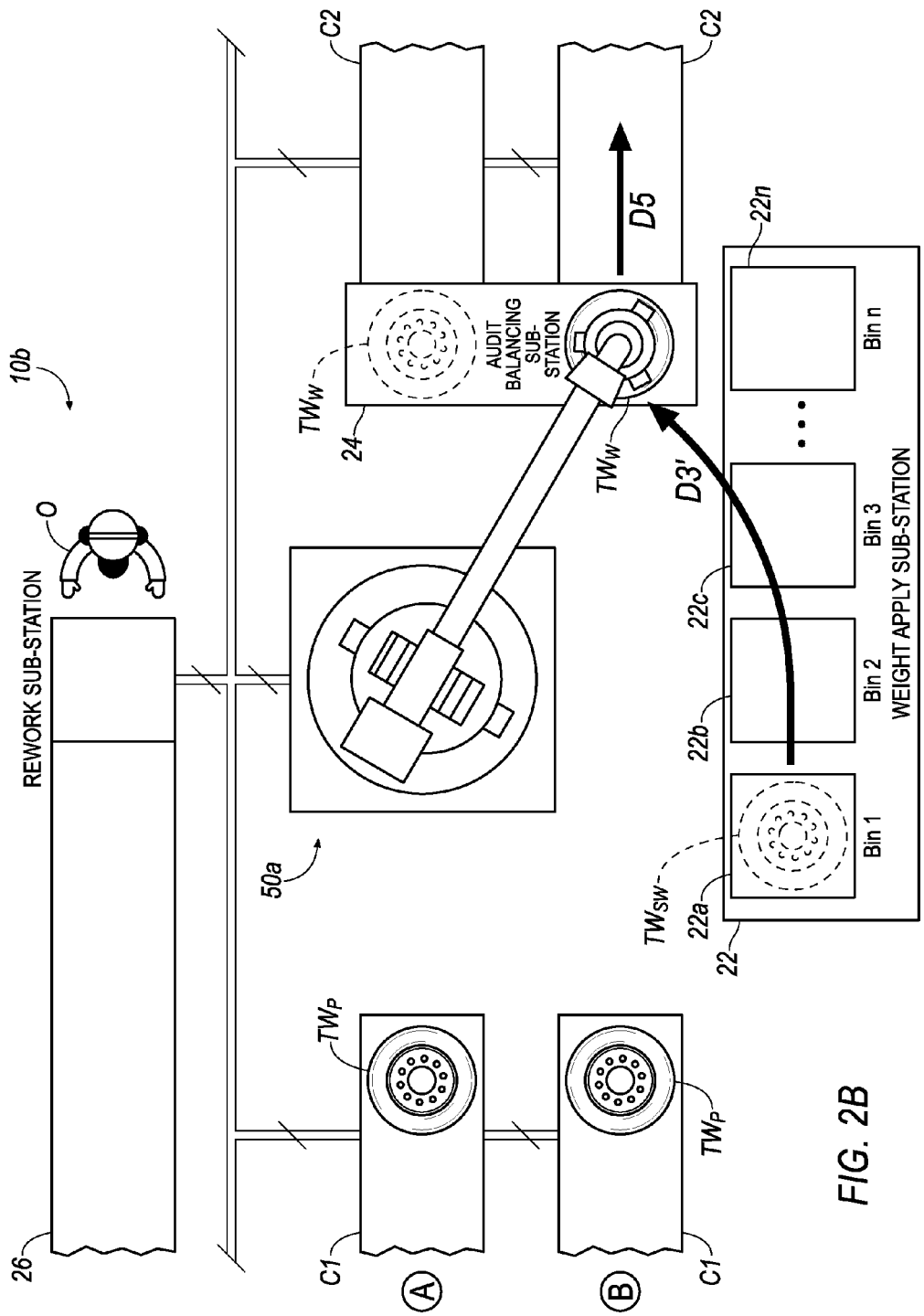

Upon placement of one or more supplemental weights upon the weighted tire-wheel assembly, $TW_W$, at the weight applicator sub-station 22, the weighted tire-wheel assembly, $TW_W$, may be hereinafter referred to as a supplementally weighted tire-wheel assembly, $TW_{SW}$. Referring to FIG. 2B, the device 50a then moves the supplementally weighted tire-wheel assembly, $TW_{SW}$, from the weight applicator sub-station 22 to audit balancing sub-station 24 in the direction according to arrow, D3'. The audit balancing sub-station 24 then re-processes the supplementally weighted tire-wheel assembly, $TW_{SW}$, and, if the audit balancing sub-station 24 determines that the one or more weights applied to the supplementally balanced tire-wheel assembly, $TW_{SW}$, resulted in the cancellation of any imbalance to the weighted tire-wheel assembly, $TW_W$, the supplementally balanced tire-wheel assembly, $TW_{SW}$, may be discharged according to the direction of arrow, D5.

Figure 3A:
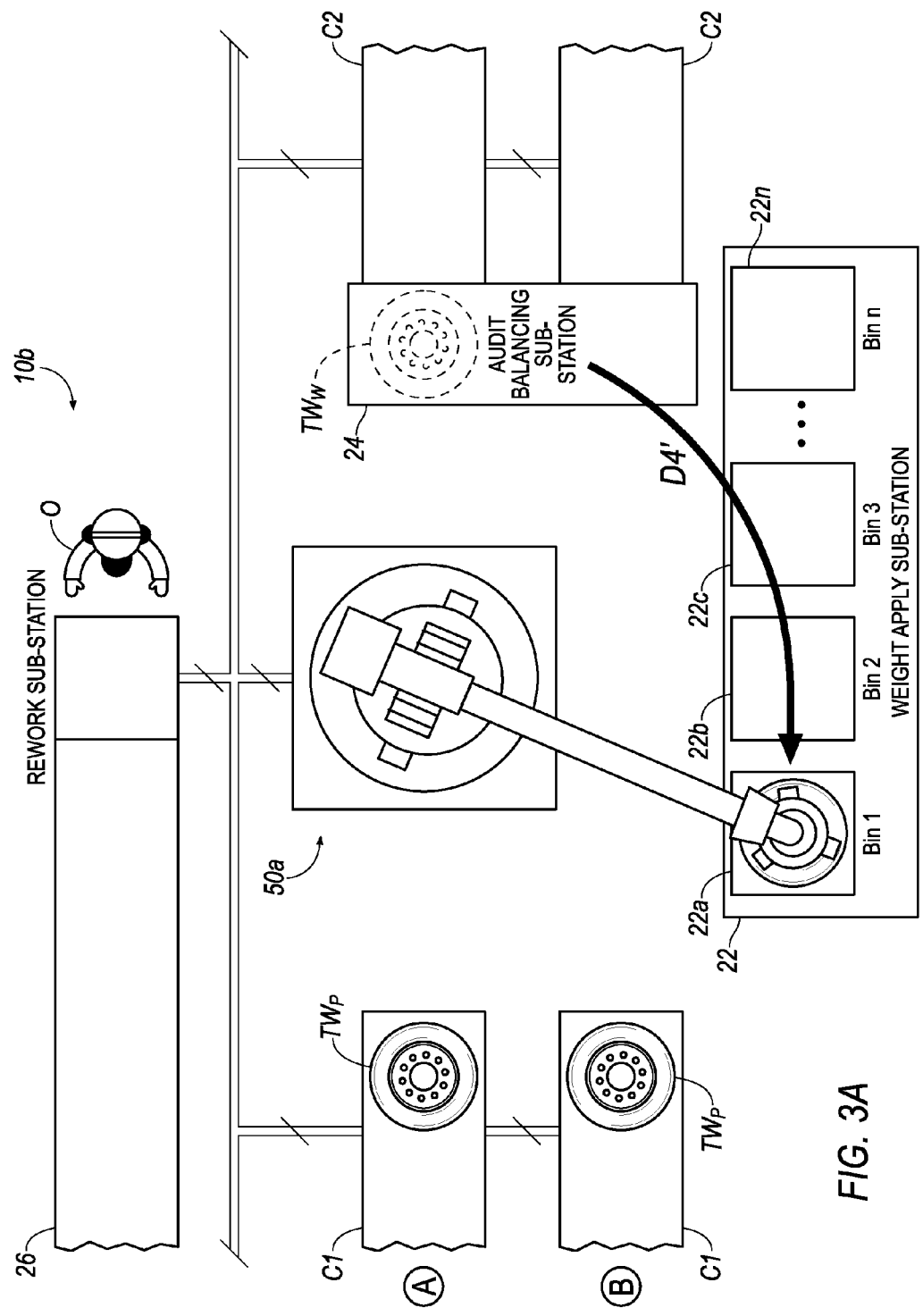
Figure 3C:
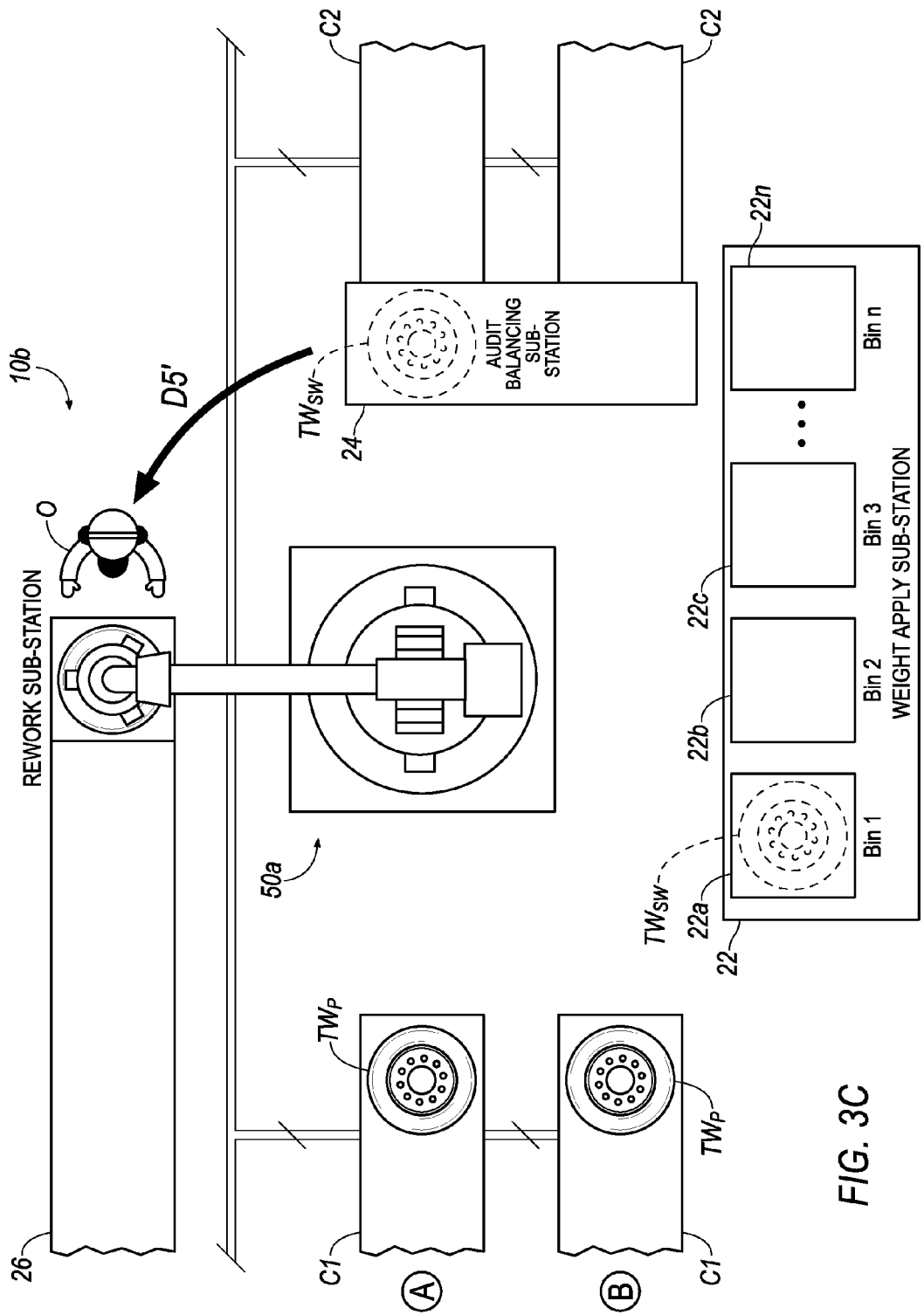
Figure 3D:
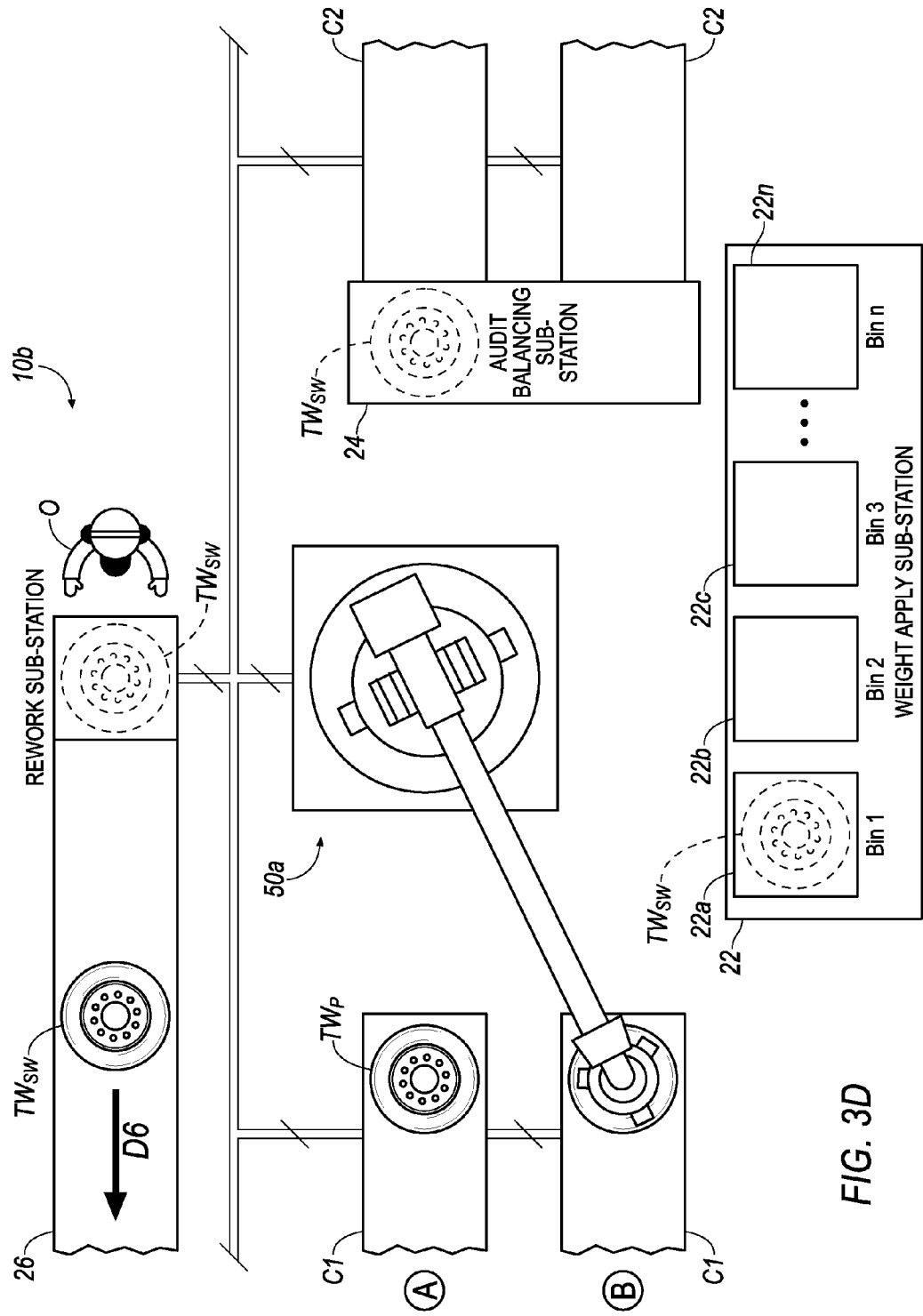

It will be appreciated, however, that after adding one or more supplemental weights to the weighted tire-wheel assembly, $TW_W$, an imbalance may yet still persist. Accordingly, referring to FIGS. 3A-3B, the above described movements in the directions of arrows D4' (see, e.g., FIG. 3A) and D3' (see, e.g., FIG. 3B) are conducted. Then, as seen in FIG. 3C, upon learning of the persistent imbalance at the audit balancing sub-station 24, the supplementally weighted tire-wheel assembly, $TW_{SW}$, may be discharged according to the direction of arrow, D5', to a rework sub-station 26. In an embodiment, the movement of the supplementally weighted tire-wheel assembly, $TW_{SW}$, in the direction of arrow, D5', may be conducted automatically by the device 50a, or, alternatively, manually by an operator, O. As seen in FIG. 3D, the persistently imbalanced tire-wheel assembly, $TW_{SW}$, is moved by or from the rework sub-station 26 in the direction according to arrow, D6, for one or more of an inspection, testing, removal of weights, and/or further processing.

It will be appreciated that the audit balancing sub-station 24 described in FIGS. 1A-3D prevents potentially imbalanced tire-wheel assemblies, $TW_W$, $TW_{SW}$, from being discharged by the single-cell workstation 10b. One or more reasons may contribute to an imbalanced tire-wheel assembly, $TW_W$, $TW_{SW}$. For example, the device 50a may retrieve a weight from one or more of the bins 22a-22n that do not have an expected value; accordingly, it is probable that, for example, a ½ ounce weight may be improperly placed with and retrieved from the bin 22a when it is expected that the bin 22a contains, for example, ⅛ ounce weights. Further, in an embodiment, one or more of the preliminary balancing sub-station 20 and the audit balancing sub-station 24 may not be properly calibrated, thereby resulting in an imbalance of the tire-wheel assembly, $TW_W$, $TW_{SW}$. As such, in view of the above examples, it will be appreciated that if one or more imbalanced tire-wheel assemblies, $TW_W$, $TW_{SW}$, are discharged according to the direction of arrow, D5', to the rework sub-station 26, one or more of the single-cell workstations 10a, 10b may be selectively shut down such that an operator, O, may discover and correct one or more issues related to an imbalance of the tire-wheel assembly, $TW_{SW}$.

Figure 4:
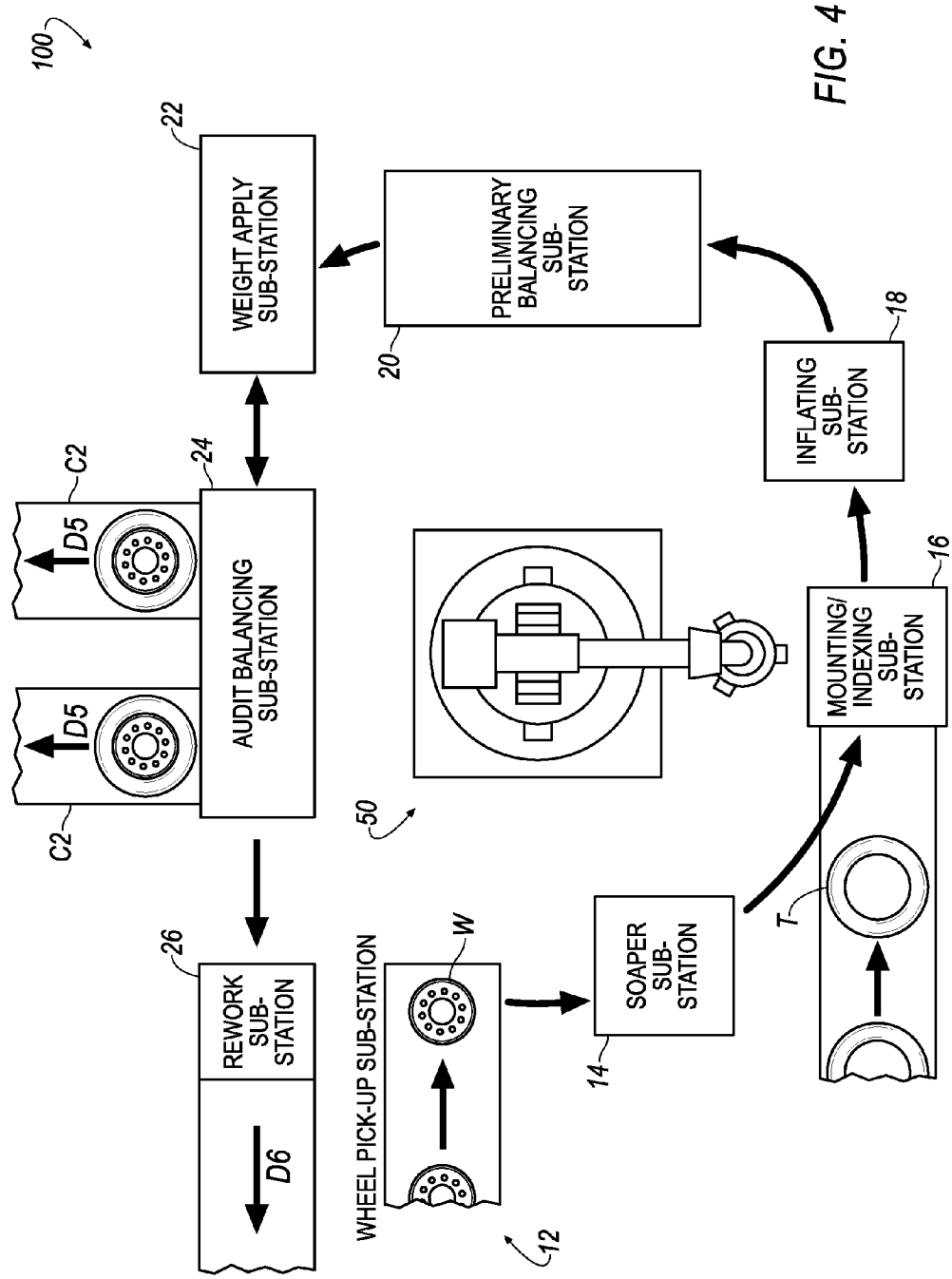
FIG. 4 illustrates an apparatus and method for processing a tire-wheel assembly in accordance with an exemplary embodiment of the invention.

Although two, distinct, single-cell workstations are shown generally at 10a and 10b, it will be appreciated that sub-stations 12-26 of each of the single-cell workstations 10a, 10b may be integrated into one, single-cell workstation, which is shown generally at 100 in FIG. 4. As such, if one, single-cell workstation 100 is provided, a single device 50 may be provided for processing a tire-wheel assembly, TW, with each of the sub-stations 12-26. As illustrated, the single-cell workstation 100 does not include the conveyor, C1, which is utilized to bridge the illustrated workstations 10a, 10b, but rather, a single conveyor, C2, for discharging tire-wheel assemblies that are approved by the audit balancing sub-station 24.

Figure 5:
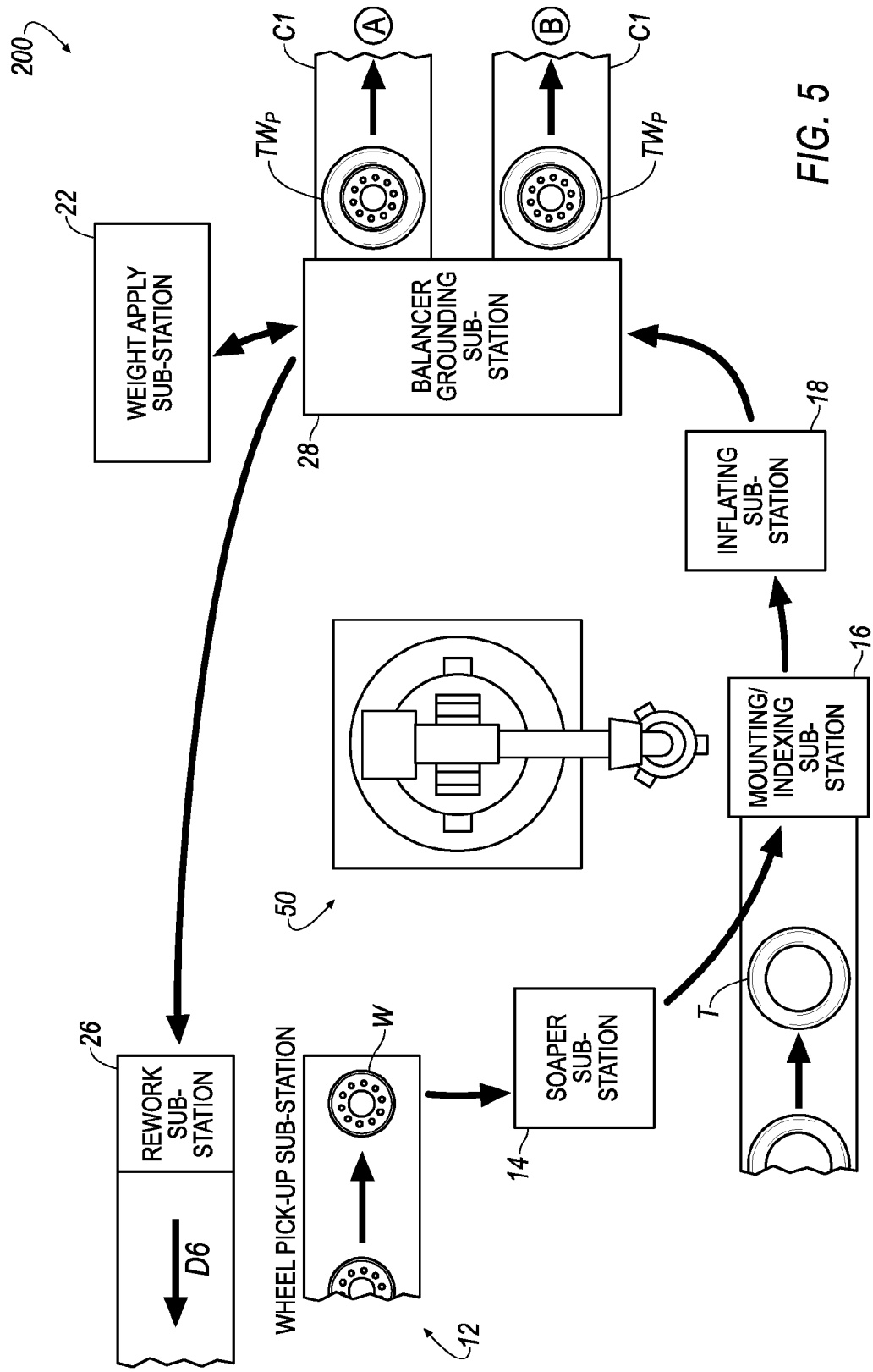
FIG. 5 illustrates an apparatus and method for processing a tire-wheel assembly in accordance with an exemplary embodiment of the invention.

Further, in an embodiment, a single-cell workstation is shown generally at 200 in FIG. 5. As illustrated, the single-cell workstation 200 also includes a device 50.

In an embodiment, the functionality of the single-cell workstation 100 shown in FIG. 4 is provided by the single-cell workstation 200 with the exception that the preliminary and audit balancing sub-stations 20, 24 are eliminated. Because the preliminary and audit balancing sub-stations 20, 24 are eliminated, the functionality of the preliminary and audit balancing sub-stations 20, 24 may be conducted by another component, such as, for example, the device 50.

In an embodiment, once the device 50 interfaces with an inflated/weighted/supplementally weighted tire-wheel assembly, $TW_I/TW_W/TW_{SW}$, the device 50 may perform the function of the preliminary/audit balancing sub-stations 20, 24 by spinning the inflated/weighted/supplementally weighted tire-wheel assembly, $TW_I/TW_W/TW_{SW}$, at an extremely fast speed. In an embodiment, the spinning of the inflated/weighted/supplementally weighted tire-wheel assembly, $TW_I/TW_W/TW_{SW}$, may be conducted by interfacing the wheel, W, of the inflated/weighted/supplementally weighted tire-wheel assembly, $TW_I/TW_W/TW_{SW}$, with the claw portion 60 and then subsequently spinning the claw portion 60 relative the arm portion 58.

Due to the fact that noise, vibrations and harshness may be experienced by the device 50 during the spinning of the inflated/weighted/supplementally weighted tire-wheel assembly, $TW_I/TW_W/TW_{SW}$, it will be appreciated that the device 50 may not properly conduct the preliminary/audit balancing operations. As such, it will be appreciated that the noise, vibrations and harshness experienced by the device 50 should be substantially cancelled or eliminated. Accordingly, to substantially cancel or eliminate the noise, vibrations and harshness, the device 50 may engage or otherwise interface with a grounding sub-station, which is shown at and herein referred to as a balancer grounding sub-station 28.

In operation, any portion 54-60 of the device 50 may be retained, clamped or otherwise secured to the balancer grounding sub-station 28. For example, in an embodiment, the arm portion 58 may be retained, clamped or otherwise secured by the balancer grounding sub-station 28. In an embodiment, the arm portion 58 may interface with and be retained within a recess formed in a body portion of the balancer grounding station 28. In another embodiment, one or more clamps may extend from the body of the balancer ground station 28 for, in an embodiment, clamping one or more portions 54-60 of the device 50, such as, for example, the arm portion 58.

Because the device 50 may be retained, clamped or otherwise secured by the balancer grounding station 28, any noise, vibrations and harshness experienced by the device 50 during the spinning of the inflated/weighted/supplementally weighted tire-wheel assembly, $TW_I/TW_W/TW_{SW}$, is thereby transmitted to and/or absorbed by the balancer grounding sub-station 28. Thus, the balancer grounding sub-station 28 may negate or minimize the noise, vibration and harshness, otherwise experienced by the device 50 such that the device 50 may repeatably perform the functions of each of the preliminary/audit balancing sub-stations 20, 24.

Because the preliminary and audit balancing functions are conduct by one mechanism (i.e., the device 50), the potential of an improperly calibrated balancing sub-station (i.e., one or both of the preliminary and audit balancing sub-stations 20, 24) is eliminated; as such, the device 50 eliminates one potential reason for an imbalanced tire-wheel assembly. Further, because two sub-stations (i.e., the preliminary and audit balancing sub-stations 20, 24) are not provided in the single cell workstation 200 when compared to the single-cell workstation 100, the overall capital and maintenance costs of the single-cell workstation 200 may be reduced in view of the lack of the additional sub-stations (i.e., the preliminary and audit balancing sub-stations 20, 24).

Figure 13:
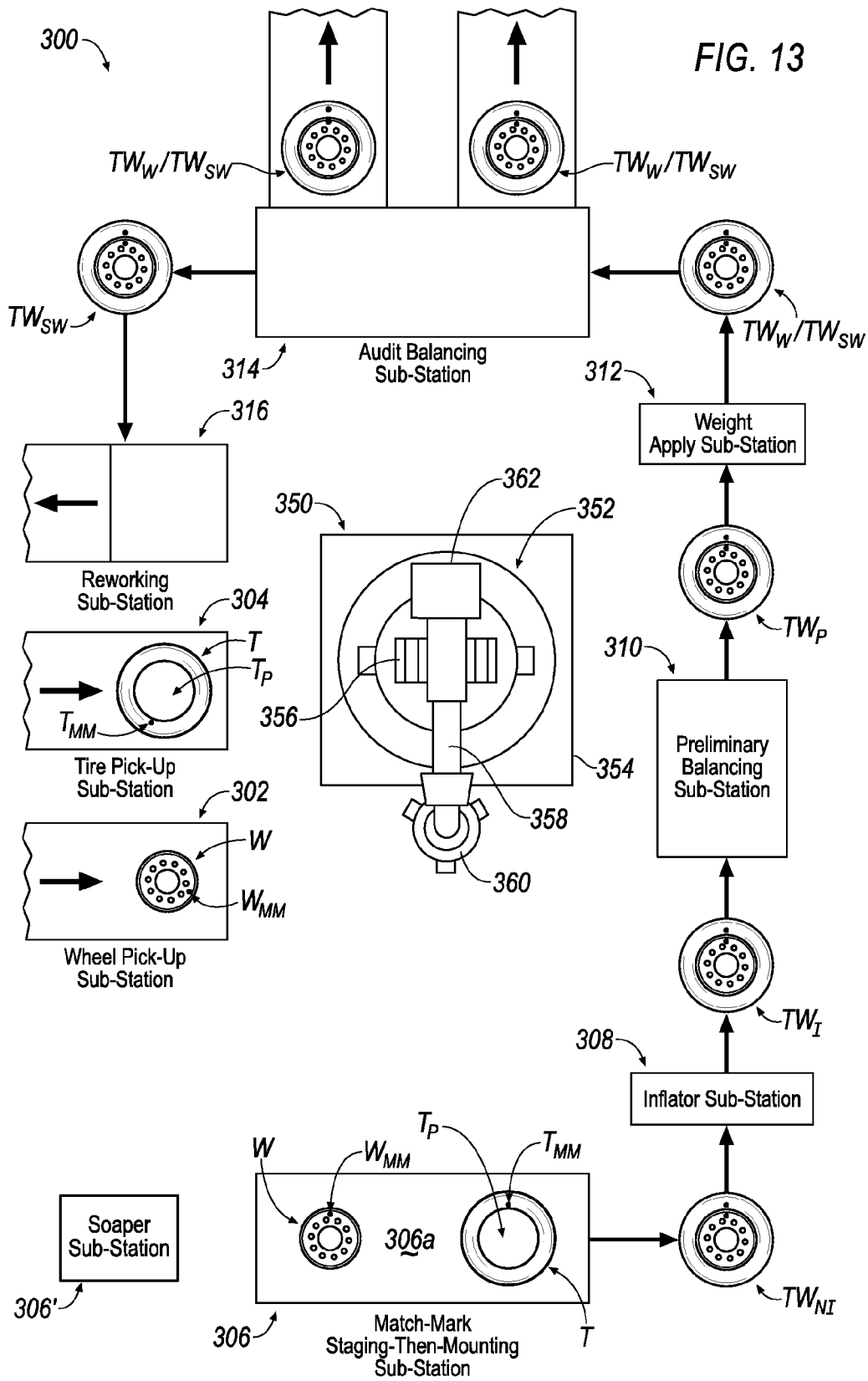
FIG. 13 illustrates a plan view of an apparatus and method for processing a tire-wheel assembly in accordance with an exemplary embodiment of the invention.

In an embodiment, a system/apparatus shown generally at 300 in FIG. 13 may be referred to as a "single-cell" workstation. In the forgoing disclosure, it will be appreciated that term "single-cell" indicates that the workstation 300 joins a tire, T, and a wheel, W, together to form a tire-wheel assembly, TW, without requiring a plurality of successive, discrete workstations that may otherwise be arranged in a conventional assembly line. Rather, the single cell workstation 300 provides one workstation having a plurality of subs-stations 302-316, each performing a specific task in the processing of a tire-wheel assembly, TW (that includes the step of joining a tire, T, to a wheel, W). As such, the novel single-cell workstation 300 significantly reduces the cost, investment and maintenance associated with a conventional tire-wheel assembly line located on a relatively large real estate footprint. Thus, capital investment and human oversight is significantly reduced when a single cell workstation 300 is employed in the processing of tire-wheel assemblies, TW.

In an embodiment, the workstation 300 includes a device 350. In an embodiment, the device 350 associated with the single-cell workstation 300 may include a robotic arm 352 that may be located in a substantially central position relative the plurality of sub-stations 302-316. In an embodiment, the robotic arm 352 may include, for example, a base portion 354, a body portion 356 connected to the base portion 354, an arm portion 358 connected to the body portion 356, and a claw portion 360 connected to the arm portion 358.

In an embodiment, the body portion 356 may be rotatably-connected to the base portion 354 such that the body portion 356 may be pivoted 360° relative the base portion 354. Further, in an embodiment, the body portion 356 may be generally hinged to the base portion 354 having, for example, hinged, scissor-style arms such that the body portion 356 may be articulated vertically upward or downward relative the base portion 354.

In an embodiment, the arm portion 358 may be connected to the body portion 356 such that the arm portion 358 may be articulated in any desirable upward or downward position relative the body portion 356. Similar to the rotatable connection of the base portion 354 and body portion 356, the claw portion 360 may be rotatably-connected to the arm portion 358 such that the claw portion 360 may be rotated, pivoted or otherwise spun 360° relative the arm portion 358. In an embodiment, as seen in FIGS. 8C and 8F, one or more components of the claw portion 360 may be spun (e.g., rotated, R) relative the arm portion 358 at a relatively high rate of speed in order to conduct a balancing operation of each of the wheel, W, and tire, T. In an embodiment, movement of the portions 354-360 may be controlled manually with a joystick (not shown), or, alternatively, automatically by way of logic stored on a controller having a processor (not shown).

In the following description, it will be appreciated that prescribed movements of the body portion 356 relative the base portion 354 may have occurred before, during or after movement of the arm portion 358 and/or claw portion 360. For example, the body portion 356 may have been rotated, articulated or the like in order to locate the arm and claw portions 358, 360 to a desired position at or proximate a particular sub-station.

With continued reference to FIG. 13, in operation, the device 350 firstly directly interfaces with each of a tire, T, and a wheel, W, at a wheel repository sub-station 302 and a tire-repository sub-station 304 of the plurality of sub-stations 302-316. Once one or more of the tire, T, and the wheel, W, are moved from the sub-stations 302, 304 to a virtual match-mark staging-then-mounting sub-station 306, the device 350 may directly interface with the wheel, W, and, subsequently, position the wheel, W, within a central passage, $T_P$, of the tire, T, for joining (i.e., "mounting") the tire, T, to/with the wheel, W, in order to form a tire-wheel assembly, TW. Thereafter, the device 350 may remain directly-interfaced with the wheel, W, in order to further process the tire-wheel assembly, TW, at successive sub-stations 308-316 of the single-cell workstation 300; by remaining directly-interfaced with the wheel, W, the single cell workstation 300 employs a methodology that eliminates the need to "hand-off" one or more of a wheel, W, and tire, T, to a subsequent workstation of a plurality of workstations in a conventional assembly line.

Figure 9B:
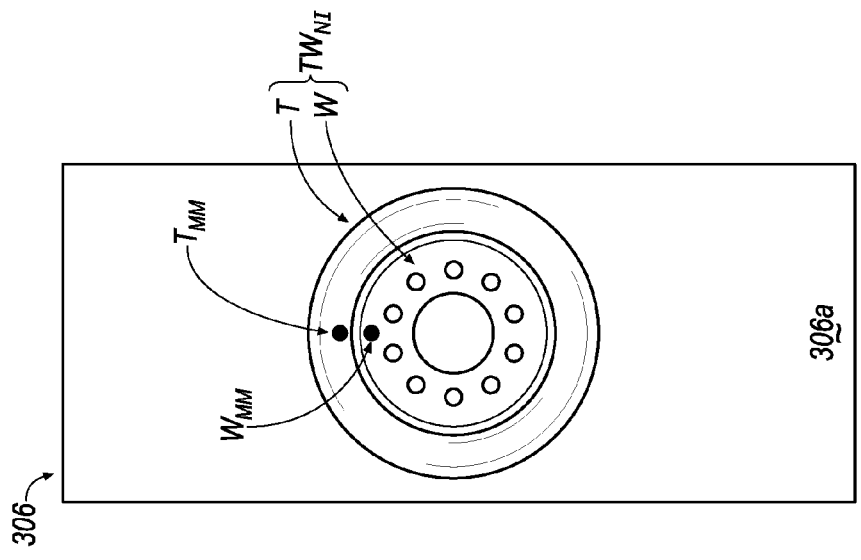

Regarding the general movement of the device 350 relative the sub-stations 302-316, in an embodiment, the robotic arm 352 is manipulated such that it 1) separately moves each of the wheel, W, and the tire, T, from the sub-stations 302, 304, 2) optionally soaps the wheel, W, at a soaping sub-station 306' prior to joining the wheel, W, to the tire, T, 3) joins the wheel, W, to the tire, T, at the virtual match-mark staging-then-mounting sub-station 306 to define a non-inflated tire-wheel assembly, $TW_{NI}$, (as also seen at FIG. 9B), 4) locates the non-inflated tire-wheel assembly, $TW_{NI}$, at an inflating sub-station 308 for inflating the non-inflated tire-wheel assembly, $TW_{NI}$, to define an inflated tire-wheel assembly, $TW_I$, 5) locates the inflated tire-wheel assembly, $TW_I$, at a preliminary balancing sub-station 310 for preliminarily balancing the inflated tire-wheel assembly, $TW_I$, to define a preliminarily balanced tire-wheel assembly, $TW_P$, 6) locates the preliminarily balanced tire-wheel assembly, $TW_P$, at a weight applicator sub-station 312 for applying one or more weights to the preliminarily balanced tire-wheel assembly, $TW_P$, to define a (supplementary) weighted tire-wheel assembly, $TW_W/TW_{SW}$, 7) locates the (supplementary) weighted tire-wheel assembly, $TW_W/TW_{SW}$, at an audit balancing sub-station 314 for auditing the condition of the (supplementary) weighted tire-wheel assembly, $TW_W/TW_{SW}$, and, optionally, 8) locates the supplementary-weight tire-wheel assembly, $TW_{SW}$, at a rework sub-station 316.

Figure 8A:
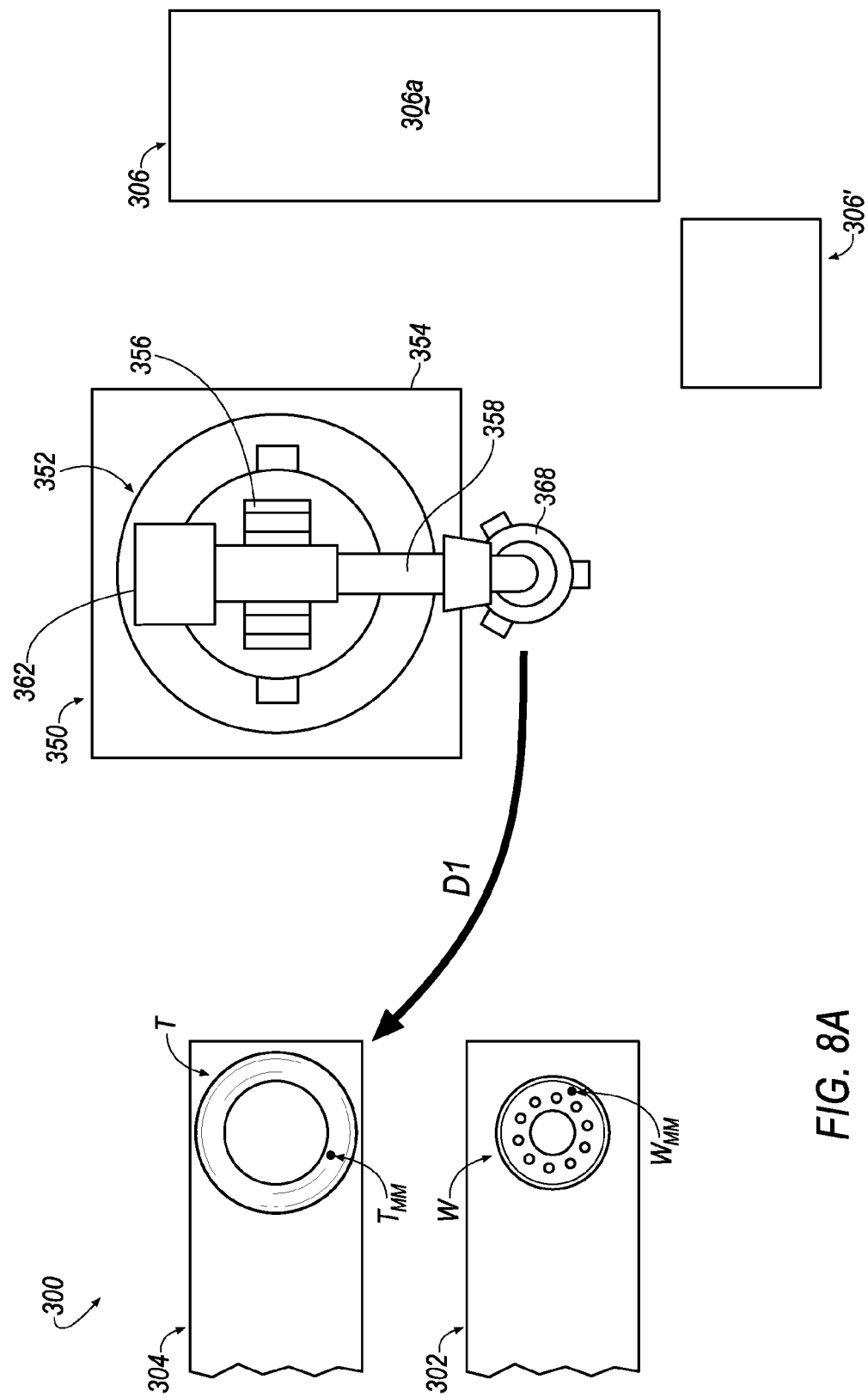
FIGS. 8A-9B illustrates an apparatus method for processing a tire-wheel assembly in accordance with an exemplary embodiment of the invention.

With reference now to FIG. 8A, physical attributes of the tire, T, and the wheel, W, are described. It should be noted that the discussed physical attributes may be inherent aspects/characteristics of each of the tire, T, and the wheel, W, which may arise from, for example, a manufacturing technique (e.g., molding, casting or the like) of each of the tire, T, and the wheel, W; accordingly, in an embodiment, one or more of the tire, T, and the wheel, W, may be referred to as being in a "new" (i.e., not used) condition, and, as a result, an embodiment of a mounting procedure may be conducted by, for example, an original equipment supplier or manufacturer of tires, T, wheels, W, or tire-wheel assemblies, TW. However, in some embodiments, one or more of the tire, T, and the wheel, W, may be in a "used" condition, and, as a result, it will be appreciated that the invention could be practiced in situations where one or more of the tire, T, and the wheel, W, are "not new;" accordingly, in such a circumstance, an embodiment of a mounting procedure may be conducted by, for example, a person or entity other than an original equipment supplier/manufacturer (e.g., the other person/entity may include a vehicle hobbyist, service station, or the like).

As seen in FIG. 8A, the tire, T, may include an inherent physical attribute that is referred to as a "high point of radial force variation" (see $T_{MM}$). When the tire, T, is in use, the high point of radial force variation may be describes as a region of the tire, T, where there is a fluctuation in force that appears in the rotating axis of the tire, T, when a specific load is applied, and, when the tire, T, is rotated at a specific speed.

The wheel, W, may include an inherent physical attribute that is referred to as a "point of minimum radial run out" (see $W_{MM}$). To a certain extent, about every wheel, W, may be manufactured with an inherent imperfection (which may arise from, for example, material distribution and/or flow of material during the manufacturing process of the wheel, W). Accordingly, the imperfection of the wheel, W, may result in the wheel, W, being "out-of-round," or, having a "run-out" (i.e., the wheel, W, therefore, may include the aforementioned "point of minimum radial run out").

When the tire, T, and the wheel, W, are joined (i.e., mounted) together, it may be desirable to align (or match) the high point of radial force variation of the tire, T, with the point of minimum radial run out of the wheel, W. The alignment or "matching" described above may, for example, improve stability of a vehicle to which a tire-wheel assembly, TW, is joined to and/or mitigate abnormal tread-wear patterns to the tire, T. The alignment or "matching" of the high point of radial force variation of the tire, T, with the point of minimum radial run out of the wheel, W, may be referred to as a "uniformity method" of "match mounting."

If, however, one or more of the high point of radial force variation of the tire, T, and the point of minimum radial run out of the wheel, W, are not determined or identified by, for example, an original equipment supplier, at the time the tire, T, and the wheel, W, are to be joined (i.e., mounted) together, one (e.g., a person or business entity) may have to determine or locate a point of lightest weight (see $T_{MM}$) of the tire, T, and/or a point of heaviest weight (see $W_{MM}$) of the wheel, W; upon determining/locating the above-described lightest/heaviest points, a substantially similar alignment/"matching" is conducted as described above prior to joining (i.e., mounting) the tire, T, and the wheel, W. In some circumstances, if a valve-stem hole (see $W_{MM}$) is provided on the wheel, W, the point of lightest weight of the tire, T, may be aligned with the valve stem hole on the wheel, W (rather than aligning the point of lightest weight of the tire, T, with the point of heaviest weight of the wheel, W). The alignment of the point of lightest weight of the tire, T, with the valve stem hole/point of heaviest weight of the wheel, W, may be referred to as a "weight method" of "match mounting."

Figure 9A:
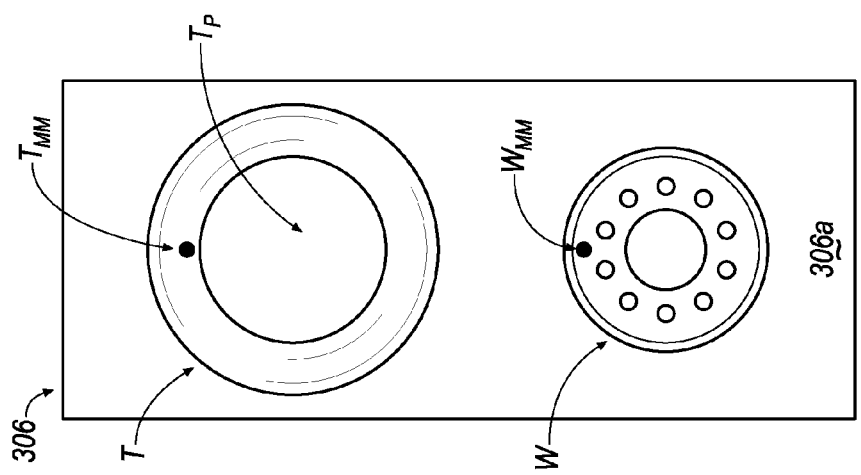

For purposes of describing an embodiment of either of the "uniformity method" or the "weight method" of "match mounting," reference is made to FIG. 9A where: 1) a region of the tire, T, is identified by the reference numeral "$T_{MM}$," and 2) a region of the wheel, W, is identified by the reference numeral "$W_{MM}$." The subscript "MM" for each of the reference numerals $T_{MM}$ and $W_{MM}$ may generally stand for "match mark," and, may be utilized in one of the "uniformity method" or "weight method" for "match mounting" the tire, T, and the wheel, W, together to form a "match-mounted" tire-wheel assembly, TW. Accordingly, if a "uniformity method" is employed in the described match mounting embodiment: 1) the reference numeral "$T_{MM}$" may stand for a region of high point of radial force variation of the tire, T, and 2) the reference numeral $W_{MM}$ may stand for a region of point of minimum radial run out of the wheel, W. Alternatively, if a "weight method" is employed in the described match mounting embodiment: 1) the reference numeral "$T_{MM}$" may stand for a point of lightest weight of the tire, T, and 2) the reference numeral $W_{MM}$ may stand for a point of heaviest weight of the wheel, W, or, a location of a valve stem hole of the wheel, W.

In describing one or more of the match mounting embodiments of the invention, the illustrated "dot" or "spot" seen in the Figures that the reference signs, $T_{MM}$, and, $W_{MM}$, point to should not be construed to be a physical/visible/tactile markings on one or more of the tire, T, and the wheel, W. In some conventional match-marking/match-mounting systems/methodologies, the tire and the wheel may include, for example, a physical marking, object or the like, such as, for example, a paint dot, a tag, a sticker, an engraving, an embossment or the like that is applied to or formed in, upon or within a surface or body portion of one or more of a tire and a wheel. In one or more embodiments of the present invention, match-mounting techniques are described that do not include any kind of or type of a physical/visible/tactile marking applied to either of the tire, T, and the wheel, W; accordingly, one of, or, many benefits realized by the present invention may be that additional material, time or steps associated with the application and/or formation of the physical marking, object or the like upon one or more of the tire, T, and the wheel, W, is obviated, thereby realizing a cost and/or time savings benefit in the assembling of a tire-wheel assembly, TW.

Because a physical marking, object or the like is not included on either of the tire, T, and the wheel, W, the spatial region of where the physical marking, object or the like would otherwise by located is initially unknown to the workstation 300, but, after one or more processing steps, the spatial region of where the physical marking, object or the like would otherwise by located may become known to/detected/learned by, for example, a computer associated with, for example, the robotic arm 352. Accordingly, although the Figures include an illustrated "dot" or "spot" that is identified by the reference signs, $T_{MM}$, and, $W_{MM}$, the illustration of the "dot" or "spot" is provided in the Figures for convenience for the purpose of the reader's edification and not to otherwise suggest that one or more of the tire, T, and the wheel, W, include a physical/visible/tactile marking or object. Thus, in an embodiment, each of the reference signs, $T_{MM}$, and, $W_{MM}$, may be referred to as a "virtual match mark region" in the following disclosure due to the fact that the spatial regions of the tire, T, and the wheel, W, are not physically marked or include an object, but, rather, are detected/determined/learned by one or more components of the workstation 300.

Referring now to FIG. 8A, a portion of the single-cell workstation 300 is shown according to an embodiment. The portion of the single-cell workstation 300 that is shown in FIG. 8A includes the wheel repository sub-station 302, the tire repository sub-station 304, the virtual match-mark staging-then-mounting sub-station 306, the soaper sub-station 306' and the robotic arm 352. A wheel, W, inherently including a virtual match-mark region, $W_{MM}$, is shown arranged upon the wheel repository sub-station 302, and, a tire, T, inherently including a virtual match-mark region, $T_{MM}$, is shown arranged upon the tire repository sub-station 304. The robotic arm 352 is shown arranged in a neutral orientation such that the robotic arm is not arranged proximate any of the sub-stations 302, 304, 306, 306'; upon actuation, the processing steps conducted by the workstation 300 may result in the robotic arm 352 being firstly moved from the neutral orientation toward the tire repository sub-station 304 according to the direction of the arrow, D1.

Figure 8B:
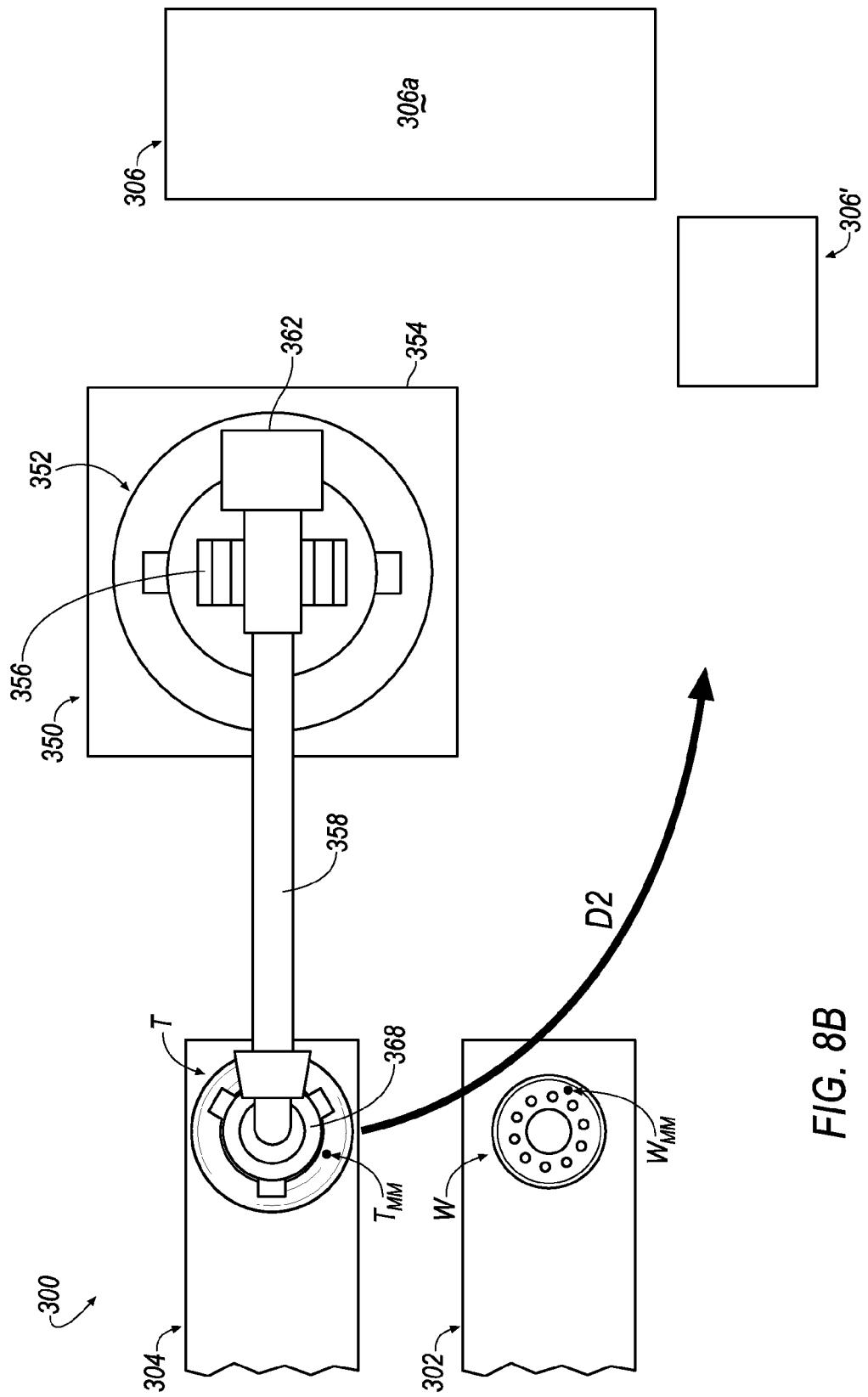

Referring to FIG. 8B, movement arising from the direction of the arrow, D1, may result in the robotic arm 352 being arranged in a manner such that, for example, the claw portion 360 may be directly interfaced with and retrieve the tire, T, from the tire-repository sub-station 304. Once directly-interfaced with the tire, T, the robotic arm 352 may move away from (and correspondingly carry the tire, T, away from) the tire-repository sub-station 304 according to the direction of the arrow, D2.

After being retrieved from the tire repository sub-station 304, the computer 362 associated with the robotic arm 352 may, for example, detect/determine/learn the location of the virtual match-mark region, $T_{MM}$, of the tire, T. The computer 362 may include one or more of a memory, processor and the like (i.e., the processor may execute a program for causing one or more devices/electronics associated with the robotic arm 352 to detect/determine/learn the location of the virtual match-mark region, $T_{MM}$, and, upon detecting/determining/learning the location of the virtual match-mark region, $T_{MM}$, the virtual match-mark region, $T_{MM}$, may be stored in the memory). Although the computer 362 is shown as a component of the robotic arm 352, the computer 362 may be separate from and comprise a component that is located remote from, but in communication with, the robotic arm 352.

Referring to FIG. 8C, the device 350 may perform an act (as a result of, for example, execution of a program by the processor), which is generally represented by arrows, R, in order to determine/detect/learn the location of the virtual match-mark region, $T_{MM}$, of the tire, T. The act, R, may include the rotation of the tire, T, relative to the robotic arm 352 (due to one or more components of the robotic arm 352 imparting a rotational motion to the tire, T), or, alternatively, a rotation of a portion (e.g., the claw portion 360) of the robotic arm 352 relative to the tire, T, in order to determine, for example the high point of radial force variation of the tire, T, (for the uniformity method) or the point of lightest weight of the tire, T (for the weight method). In an embodiment, a portion of the robotic arm 352 (e.g., the claw portion 360) may include a load roller (not shown) for the purpose of locating the high point of radial force variation of the tire, T. Further, although an act of "rotating" is described, the act may include other forms of movement other than a rotational movement, and, accordingly, the direction of the arrows, R, may generally reference that any form of any type of act may be conducted for the purpose of determining/detecting/learning the location of the virtual match-mark region, $T_{MM}$, of the tire, T.

Referring to FIG. 8C', in an alternative embodiment compared to what is described above at FIG. 8C, movement of the robotic arm 352 according to the direction of the arrow, D2, may terminate once the tire, T, has been moved/located proximate a device 305. Rather than utilizing at least a portion of the robotic arm 352 to conduct an act (see, e.g., R in FIG. 8C) for the purpose of determining/detecting/learning the location of the virtual match-mark region, $T_{MM}$, of the tire, T, the robotic arm 352 may interface the tire, T, with the device 305 such that the device 305 may be utilized to determine/detect/learn the location of the virtual match-mark region, $T_{MM}$, of the tire, T. The device 305 may be, for example, a balancing machine that may include, for example, a load roller (not shown). In an embodiment, the robotic arm 352 may interface the tire, T, with the device 305 without releasing the tire, T; alternatively, the robotic arm 352 may release the tire, T, to the device 305 and subsequently retrieve the tire, T, from the device 305 after the device 305 has determined/detected/learned the location of the virtual match-mark region, $T_{MM}$, of the tire, T. In an embodiment, a wireless or hardwired communication path 307 may communicatively-couple the device 305 and the computer 362 such that the device 305 may communication the location of the virtual match-mark region, $T_{MM}$, of the tire, T, to the computer 362.

Figure 8D:
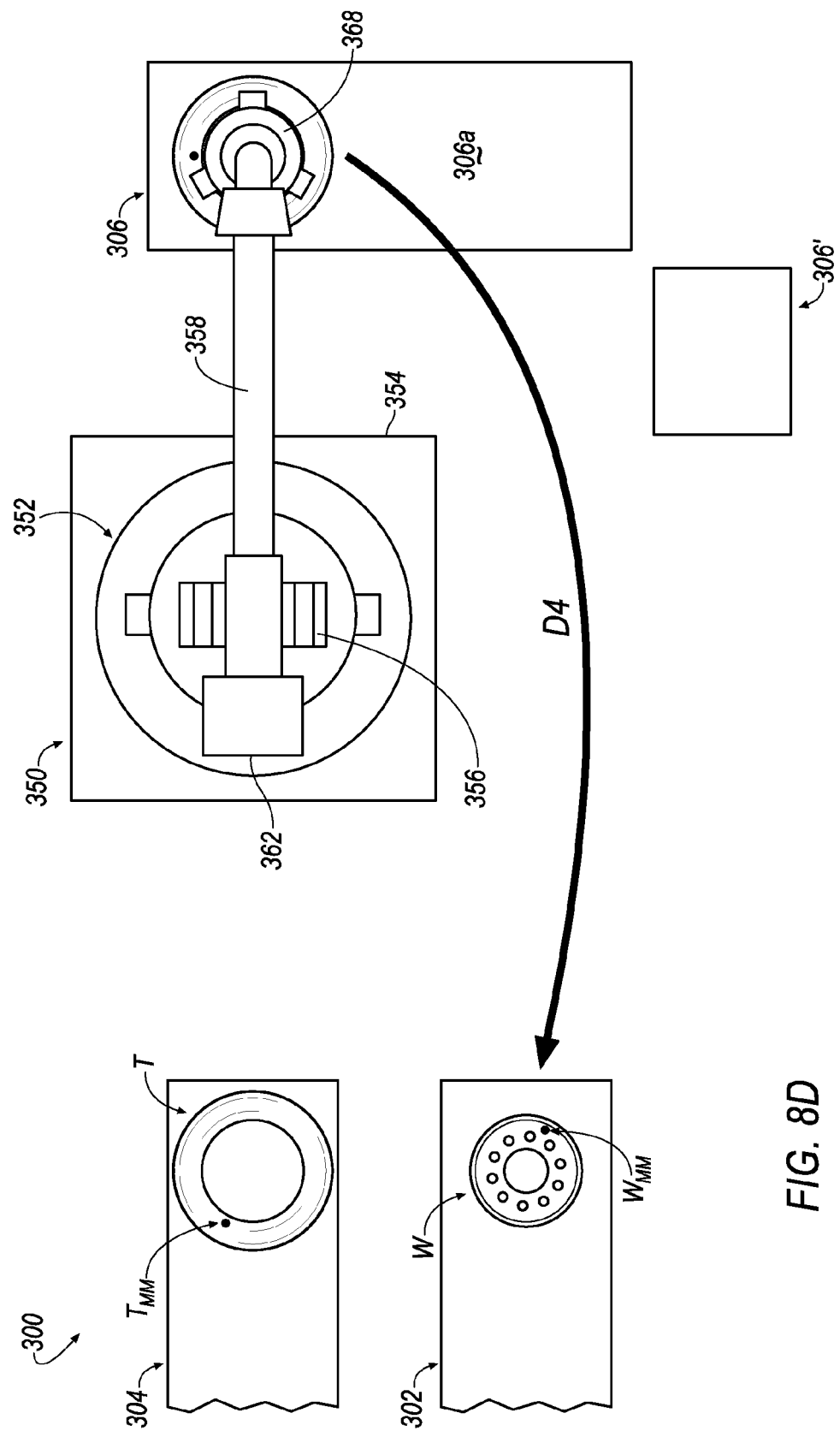

Referring to either of FIG. 8C or 8C', after determining/detecting/learning the location of the virtual match-mark region, $T_{MM}$, of the tire, T, the robotic arm 352 may move the tire, T, toward the virtual match-mark staging-then-mounting sub-station 306 according to the direction of the arrow, D3. Referring to FIG. 8D, upon being moved to the virtual match-mark staging-then-mounting sub-station 306, the robotic arm 352 may release the tire, T, such that the tire, T, is arranged upon a support surface 306a of the virtual match-mark staging-then-mounting sub-station 306; particularly, the robotic arm 352 may position the tire, T, upon the support surface 306a of the virtual match-mark staging-then-mounting sub-station 306 in a controlled manner such that the computer 362 remains aware of not only the spatial location of the tire, T, upon the support surface 306a of the virtual match-mark staging-then-mounting sub-station 306, but, also, the spatial location of the virtual match-mark region, $T_{MM}$, of the tire, T. Accordingly, upon releasing the tire, T, the robotic arm 352 may be said to have "staged" the tire, T, for a subsequent match-mounting procedure upon similarly determining/detecting/learning a virtual match-mark region, $W_{MM}$, of the wheel, W, that is to be joined with the tire, T.

Figure 8E:
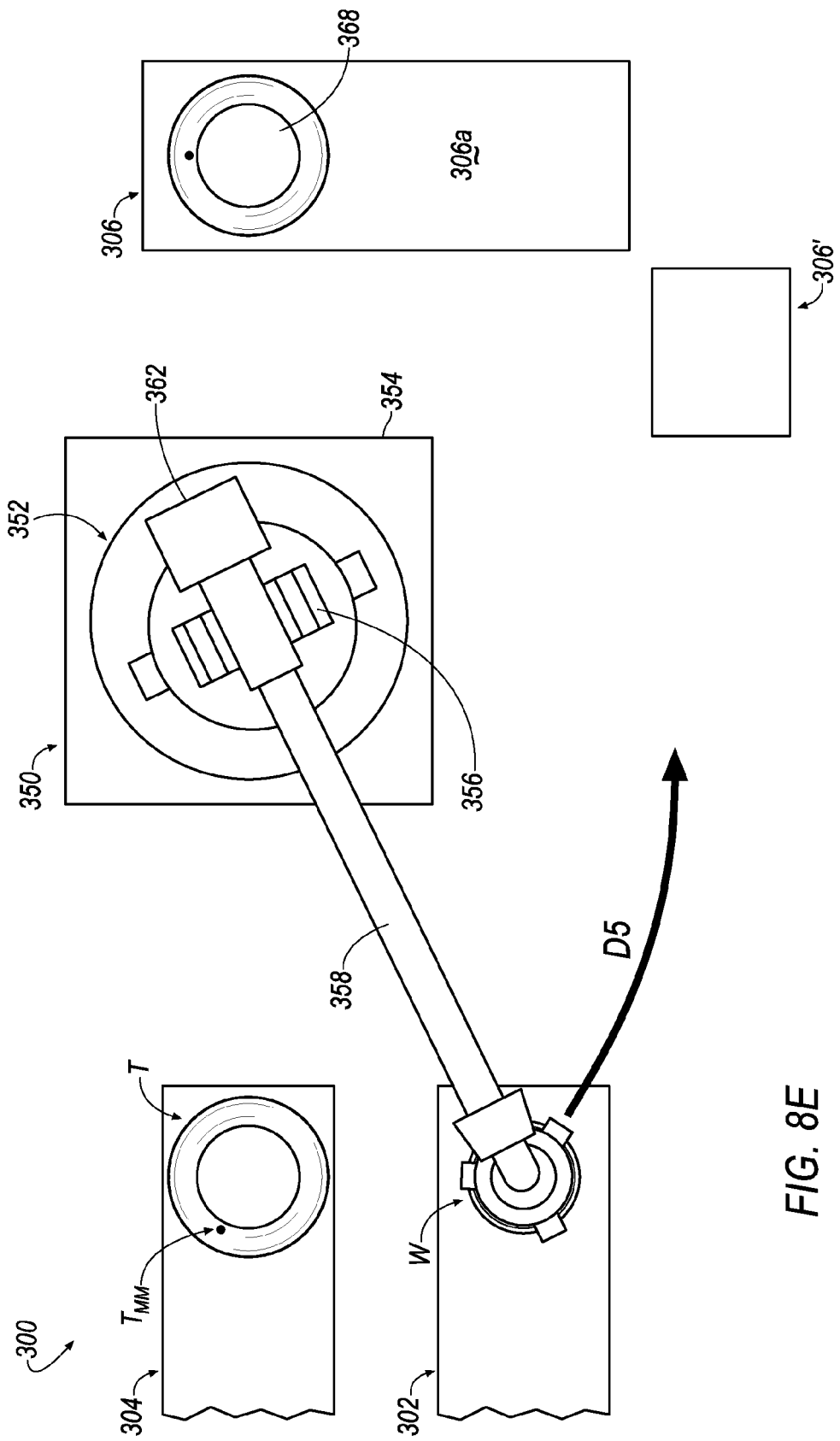

Once the tire, T, is "staged" upon the virtual match-mark staging-then-mounting sub-station 306 as described above, the robotic arm 352 may release and no longer be in direct contact with the tire, T; thereafter, as seen in FIG. 8D, the device 352 may move according to the direction of the arrow, D4, toward the wheel repository sub-station 302. Referring to FIG. 8E, movement arising from the direction of the arrow, D4 (see FIG. 8D), may result in the robotic arm 352 being arranged in a manner such that, for example, the claw portion 360 may be directly interfaced with and retrieve the wheel, W, from the wheel-repository sub-station 302. Once directly-interfaced with the wheel, W, the robotic arm 352 may move away from (and correspondingly carry the wheel, W, away from) the wheel-repository sub-station 302 according to the direction of the arrow, D5.

After being retrieved from the wheel repository sub-station 302, the computer 362 associated with the robotic arm 352 may detect or learn the location of the virtual match-mark region, $W_{MM}$, of the wheel, W. The processor may execute a program for causing one or more devices/electronics associated with the computer 362 to detect/determine/learn the location of the virtual match-mark region, $W_{MM}$, of the wheel, W. The location of the virtual match-mark region, $W_{MM}$, of the wheel, W, may be stored in the memory of the computer 362.

Referring to FIG. 8F, the device 350 may perform an act, which is generally represented by arrows, R, in order to determine/detect/learn the location of the virtual match-mark region, $W_{MM}$, of the wheel, W. The act, R, may include the rotation of the wheel, W, relative to the robotic arm 352 (due to one or more components of the robotic arm 352 imparting a rotational motion to the wheel, W), or, alternatively, a rotation of a portion (e.g., the claw portion 360) of the robotic arm 352 relative to the wheel, W, in order to determine, for example the point of minimum radial run out of the wheel, W, (for the uniformity method) or the point of heaviest weight or a location of a valve stem hole of the wheel, W (for the weight method). In an embodiment, a portion of the robotic arm 352 (e.g., the claw portion 360) may include data arms and dial indicators (not shown) for the purpose of locating the point of minimum radial run out of the wheel, W. Further, the act may include other forms of movement other than a rotational movement, and, accordingly, the direction of the arrows, R, may generally reference that any form of any type of act may be conducted for the purpose of determining/detecting/learning the location of the virtual match-mark region, $W_{MM}$, of the wheel, W.

Referring to FIG. 8F' in an alternative embodiment compared to what is described above at FIG. 8F, movement of the robotic arm 352 according to the direction of the arrow, D5, may terminate once the wheel, W, has been moved/located proximate the device 305. Rather than utilizing at least a portion of the robotic arm 352 to conduct an act for the purpose of determining/detecting/learning the location of the virtual match-mark region, $W_{MM}$, of the wheel, W, the robotic arm 352 may interface the wheel, W, with the device 305 such that the device 305 may be utilized to determine/detect/learn the location of the virtual match-mark region, $W_{MM}$, of the wheel, W. The device 305 may be, for example, a balancing machine that may include, for example, data arms and dial indicators (not shown). In an embodiment, the robotic arm 352 may interface the wheel, W, with the device 305 without releasing the wheel, W; alternatively, the robotic arm 352 may release the wheel, W, to the device 305 and subsequently retrieve the wheel, W, from the device 305 after the device 305 has determined/detected/learned the location of the virtual match-mark region, $W_{MM}$, of the wheel, W. In an embodiment, the wireless or hardwired communication path 307 may communicatively-couple the device 305 and the robotic arm 352 such that the device 305 may communication the location of the virtual match-mark region, $W_{MM}$, of the wheel, W, to the computer 362.

Figure 8G:
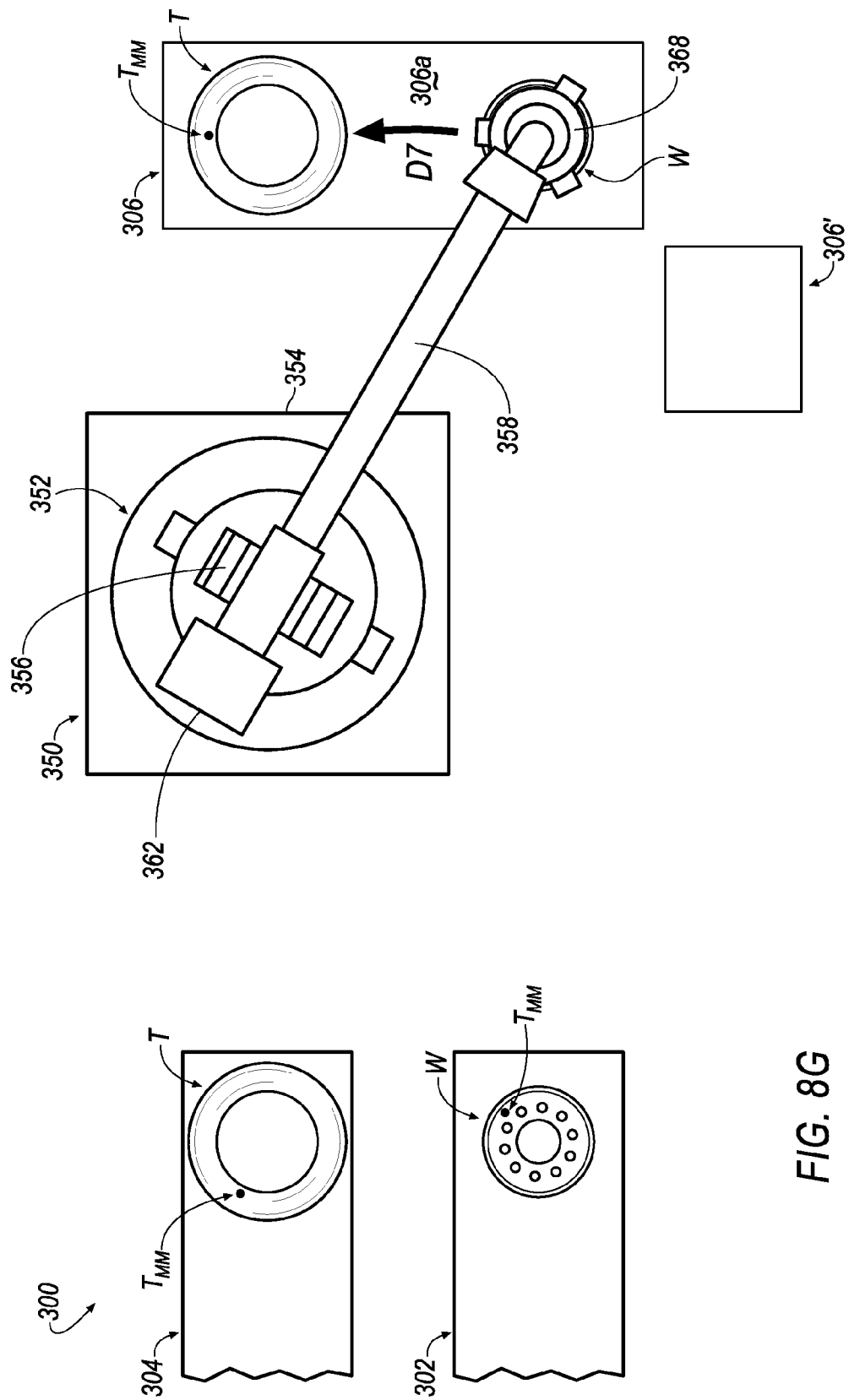
Figure 8H:
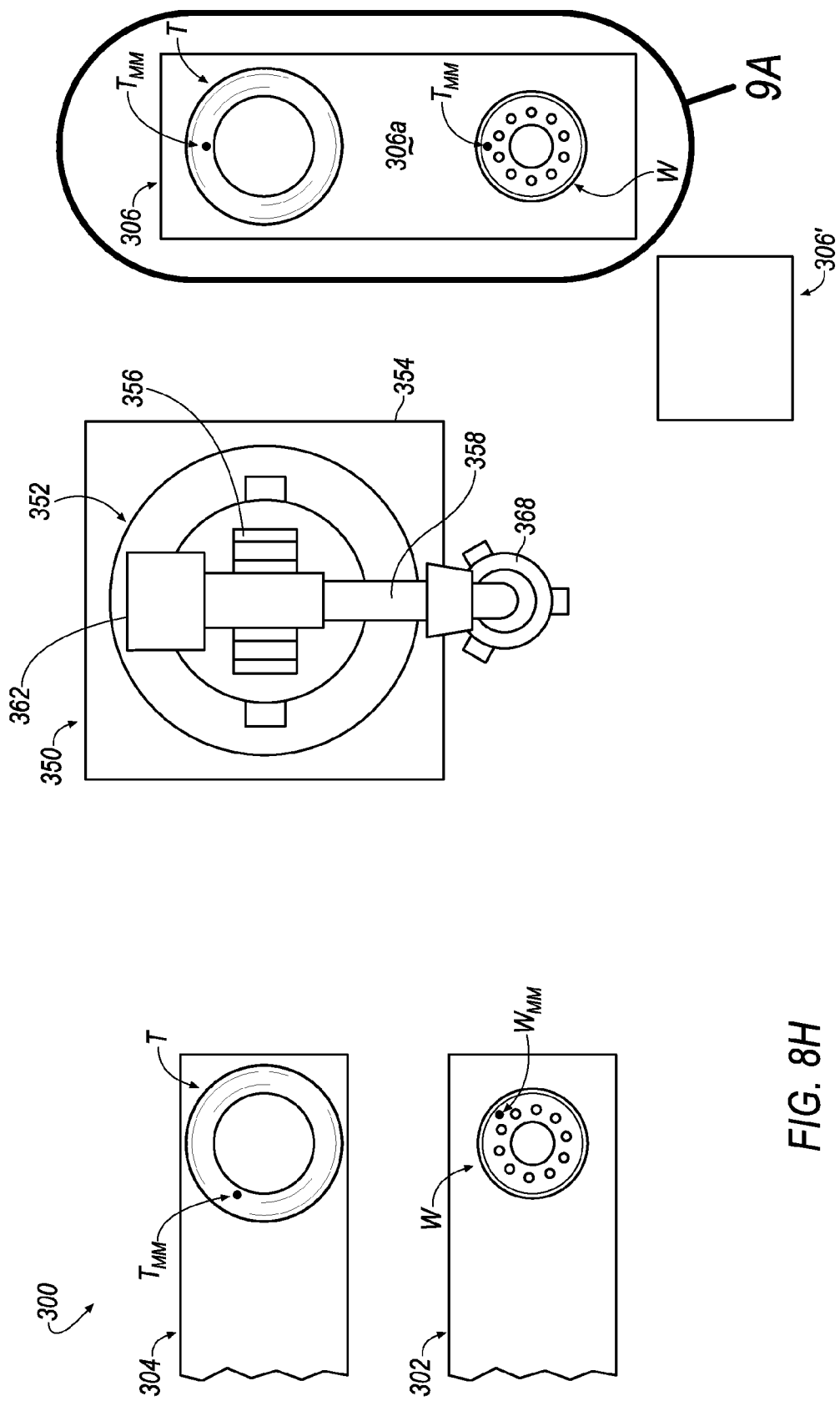

Referring to either of FIG. 8F or 8F', after determining/detecting/learning the location of the virtual match-mark region, $W_{MM}$, of the wheel, W, the robotic arm 352 may move the wheel, W, toward the virtual match-mark staging-then-mounting sub-station 306 according to the direction of the arrow, D6. Referring to FIG. 8G, upon being moved to the virtual match-mark staging-then-mounting sub-station 306, the robotic arm 352 may release the wheel, W, such that the wheel, W, may be arranged upon the support surface 306a of the virtual match-mark staging-then-mounting sub-station 306 (see, e.g., FIGS. 8H and 9A); particularly, the robotic arm 352 may position the wheel, W, upon the support surface 306a of the virtual match-mark staging-then-mounting sub-station 306 in a controlled manner such that the computer 362 remains aware of not only the spatial location of the wheel, W, upon the support surface 306a of the virtual match-mark staging-then-mounting sub-station 306, but, also, the spatial location of the virtual match-mark region, $W_{MM}$, of the wheel, W. Accordingly, upon releasing the wheel, W, the robotic arm 352 may be said to have "staged" the wheel, W, for a subsequent match-mounting procedure for joining the wheel, W, to the tire, T, as seen in FIG. 9B, in order to form a virtually match-mounted (i.e., virtual match-mark regions, $W_{MM}$, $T_{MM}$, are adjacently-aligned), non-inflated tire-wheel assembly, $TW_{NI}$.

In an alternative embodiment, the robotic arm 352 may not release the wheel, W, at FIG. 8G, in order to "stage" the wheel, W, but, rather, proceed with moving the wheel, W, according to the direction of the arrow, D7, toward the location of the tire, T, that was previously "staged" upon the support surface 306a of the virtual match-mark staging-then-mounting sub-station 306. Upon moving the wheel, W, according to the direction of the arrow, D7, the robotic arm 352 may proceed to a match-mounting process for joining the wheel, W, to the tire, T, in order to form a virtually match-mounted, non-inflated tire-wheel assembly, $TW_{NI}$.

Referring to FIGS. 9A-9B, after "staging" the wheel, W, upon the support surface 306a, or, the robotic arm 352 moving the wheel, W, toward the "staged" tire, T, without releasing the wheel, W, upon the support surface 306a, the wheel, W, may be joined to the tire, T, as a result of the robotic arm 352 inserting the wheel, W, into a central opening or passage, $T_P$, formed by the tire, T. During the insertion process, the computer 362 causes the robotic arm 352 to adjacently-align the determined/detected/learned spatial location of each of the virtual match-mark region, $W_{MM}$, of the wheel, W, and the virtual match-mark region, $T_{MM}$, of the tire, T. Accordingly, as seen in FIG. 9B, the workstation 300, which may be referred to as an apparatus or a system, may be said to "virtually match-mount" the wheel, W, to the tire, T, as a result of the controllable-insertion of the wheel, W, into the central passage, $T_P$, of the tire, T, such that the virtual match-mark regions, $W_{MM}$, $T_{MM}$, are adjacently-aligned with one another in order to form a virtually match-mounted, non-inflated tire-wheel assembly, $TW_{NI}$.

Referring to either FIG. 8F or 8F', in yet another alternative embodiment, prior to advancing the wheel, W, toward the virtual match-mark staging-then-mounting sub-station 306 according to the direction of the arrow, D6, the robotic arm 352 may be advance according to the direction of the arrow, D6' (which may include a first component of the direction according to the arrow, D6), in order to interface the wheel, W, with a soaping sub-station 306'. The soaping sub-station 306' may include a lubricant bath. Accordingly, some of the lubricant bath may be disposed upon an exterior surface of the wheel, W, such that the wheel, W, may include some of the lubricant bath disposed upon the exterior surface of the wheel, W, for the purpose of reducing friction when the workstation 300 virtually match-mounted the wheel, W, with the tire, T, in order to form a virtually match-mounted, non-inflated tire-wheel assembly, $TW_{NI}$.

Referring now to FIG. 10A, once the tire, T, and the wheel, W, have been processed by the sub-stations, 302, 304, 306, 306', in order to form a virtually match-mounted, non-inflated tire-wheel assembly, $TW_{NI}$, the robotic arm 352 may remain directly-interfaced with the wheel, W, such that the robotic arm 352 moves (according to the direction of the arrow, D8) the virtually match-mounted, non-inflated tire-wheel assembly, $TW_{NI}$, toward the inflation sub-station 308 for inflating the virtually match-mounted, non-inflated tire-wheel assembly, $TW_{NI}$. With continued reference to FIG. 10A, the robotic arm 352 may remain directly-interfaced with the wheel, W, such that the robotic arm 352 moves (according to the direction of the arrow, D9) the now-inflated, virtually match-mounted, tire-wheel assembly, $TW_I$, to a preliminary balancing sub-station 310. With continued reference to FIG. 10A, the robotic arm 352 may remain directly-interfaced with the wheel, W, such that the robotic arm 352 moves (according to the direction of the arrow, D10) the now-preliminary balanced, inflated and virtually match-mounted, tire-wheel assembly, $TW_P$, to a preliminary balancing sub-station 310.

Figure 10B:
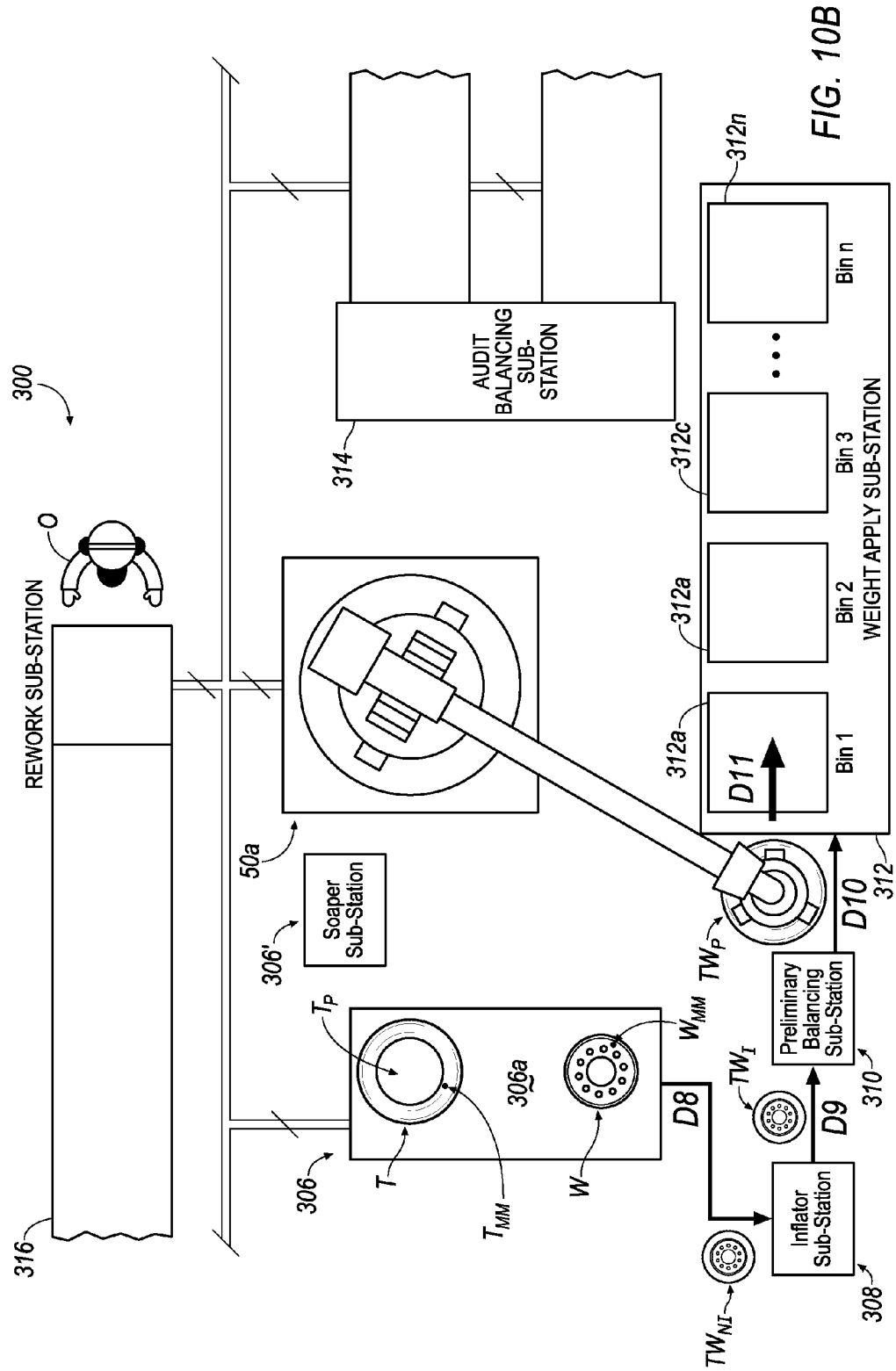

Referring to FIG. 10B, one or more of the device 350 and weight applicator sub-station 312 may determine, or, alternatively, be provided with weight application information for the preliminarily balanced tire-wheel assembly, $TW_P$. In an embodiment, the weight application information may be communicated wirelessly, or, alternatively, over a hard-wire connection from the preliminary balancing sub-station 310 to one or more of the device 350 and weight application sub-station 312. In an embodiment, rather than communicating the weight application information, the weight application information may be printed on the preliminarily balanced tire-wheel assembly, $TW_P$. In an embodiment, the information may be printed on the preliminarily balanced tire-wheel assembly, $TW_P$, in the form of a bar code that is read by one or more of the device 350 and weight application sub-station 312.

In an embodiment, the weight application information may include a value of weight that is to be added to the preliminarily balanced tire-wheel assembly, $TW_P$. In an embodiment, the weight application information may also include the location on the preliminarily balanced tire-wheel assembly, $TW_P$, where the value of the weight is to be applied. In an embodiment, the weight may be applied to the preliminarily balanced tire-wheel assembly, $TW_P$, at any desirable location including, for example, a rim of the wheel, W. In an embodiment, the weight may be clipped to, or, alternatively, adhered to the wheel, W.

As such, when the device 350 moves the preliminarily balanced tire-wheel assembly, $TW_P$, from the preliminary balancing sub-station 310 to the weight applicator sub-station 312 according to the direction of the arrow, D11, the provided or determined weight application information may correlate to one or more unique weights that may be retrieved from one or more of a plurality of bins 312a-312n located at the weight applicator sub-station 312. In an embodiment, each of the bins 312a-312n may each contain a plurality of weights. In an embodiment, each bin 312a-312n includes a plurality of weights having a similar value; accordingly, in an embodiment, bin 312a may include a plurality of ⅛ ounce weights, bin 312b may include a plurality of ¼ ounce weights, bin 312c may include a plurality of ½ ounce weights, etc. In an embodiment the weights may include one or more of a clip and adhesive for attachment to, for example, the wheel, W.

It will be appreciated, however, that the weight applicator sub-station 312 is not limited to include a plurality of bins 312a-312n nor a plurality of weights having different values. In an embodiment, for example, the weight applicator sub-station 312 may include a device that manufactures a weight to a specific value that is provided from the weight application information. For example, in an embodiment, the weight applicator sub-station 312 may include a plurality of weighted slugs having a value of x-ounces; then, upon learning the weight application information, a portion of one of the weighted slugs may be cut, fractured, or otherwise separated to define a slug shard having a weight value that is called for by the weight application information. In an embodiment, the slug shard may include one or more of a clip and adhesive for attachment to, for example, the wheel, W.

Referring to FIG. 10C, once the one or more weights are retrieved from the one or more bins 312a-312n and applied to the preliminarily balanced tire-wheel assembly, $TW_P$, the preliminarily balanced tire-wheel assembly, $TW_P$, may be referred to as a weighted tire-wheel assembly, $TW_W$. The device 350 then moves the weighted tire-wheel assembly, $TW_W$, to an audit balancing sub-station 314 according to the direction of the arrow, D12. Once received at the audit balancing sub-station 314, the audit balancing sub-station 314 determines if the one or more weights applied to the preliminarily balanced tire-wheel assembly, $TW_P$, at the weight applicator sub-station 312 has corrected the imbalance of the inflated tire-wheel assembly, $TW_I$, as determined by the preliminary balancing sub-station 310.

Figure 10E:
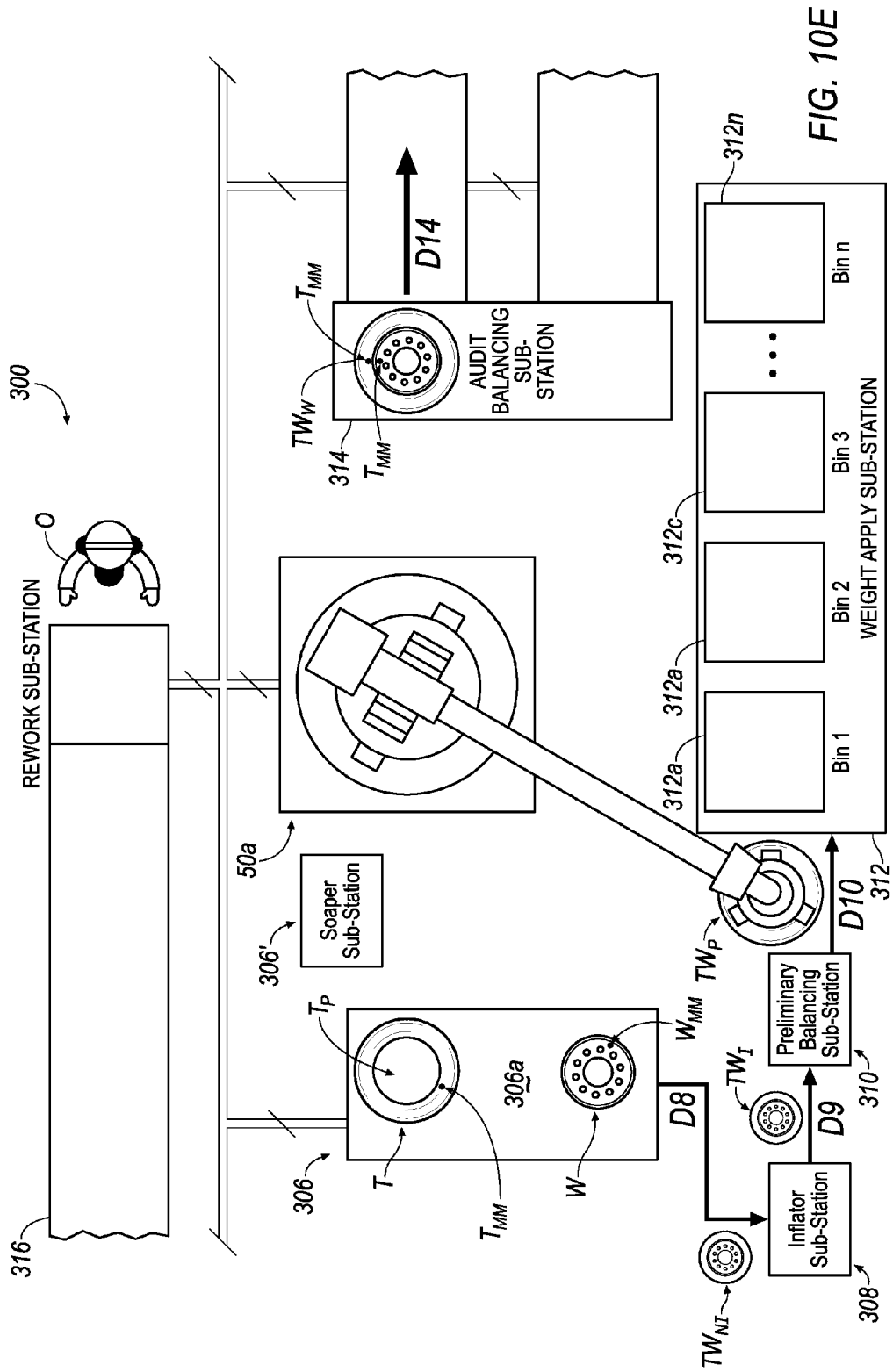

As seen in FIG. 10D, the device 350 may be returned to a position proximate the sub-stations 302-310 according to the direction of arrow, D13, in order to prepare and subsequently move another preliminarily balanced tire-wheel assembly, $TW_P$, to the weight applicator sub-station 312. As seen in FIG. 10E, during or after the movement of the device 350 in the direction of arrow, D13, the weighted tire-wheel assembly, $TW_W$, located at the audit balancing sub-station 314 may be discharged onto a discharging device, conveyor, or the like, which is shown generally at C2, for movement in the direction according to arrow, D14.

It will be appreciated that the weighted tire-wheel assembly, $TW_W$, may be discharged in the direction of arrow, D14, from the audit balancing sub-station 314 if the audit balancing sub-station 314 has determined that the one or more weights applied to the preliminarily balanced tire-wheel assembly, $TW_P$, at the weight applicator sub-station 312 resulted in the cancellation of any imbalance to the inflated tire-wheel assembly, $TW_I$. Alternatively, as seen in FIG. 11A, if, for example, the audit balancing sub-station 314 has determined that the weighted tire-wheel assembly, $TW_W$, remains imbalanced, the device 350 may retrieve the weighted tire-wheel assembly, $TW_W$, from the audit balancing sub-station 314 for movement of the weighted tire-wheel assembly, $TW_W$, from the audit balancing sub-station 314 back to the weight applicator sub-station 312 according to the direction of arrow, D13'.

If, for example, the device 350 moves the weighted tire-wheel assembly, $TW_W$, according to the direction of arrow, D13', the audit balancing sub-station 314 may provide supplemental weight application information (e.g., wirelessly and/or hardwired as similarly described above) to, for example, the device 350/weight applicator sub-station 312, or, alternatively, the audit balancing sub-station 314 may print the supplemental weight application information on the weighted tire-wheel assembly, $TW_W$, for further use by the device 350 or weight applicator sub-station 312.

Upon placement of one or more supplemental weights upon the weighted tire-wheel assembly, $TW_W$, at the weight applicator sub-station 312, the weighted tire-wheel assembly, $TW_W$, may be hereinafter referred to as a supplementally weighted tire-wheel assembly, $TW_{SW}$. Referring to FIG. 11B, the device 350 then moves the supplementally weighted tire-wheel assembly, $TW_{SW}$, from the weight applicator sub-station 312 to audit balancing sub-station 314 in the direction according to arrow, D12'. The audit balancing sub-station 314 then re-processes the supplementally weighted tire-wheel assembly, $TW_{SW}$, and, if the audit balancing sub-station 314 determines that the one or more weights applied to the supplementally balanced tire-wheel assembly, $TW_{SW}$, resulted in the cancellation of any imbalance to the weighted tire-wheel assembly, $TW_W$, the supplementally balanced tire-wheel assembly, $TW_{SW}$, may be discharged according to the direction of arrow, D14.

Figure 12C:
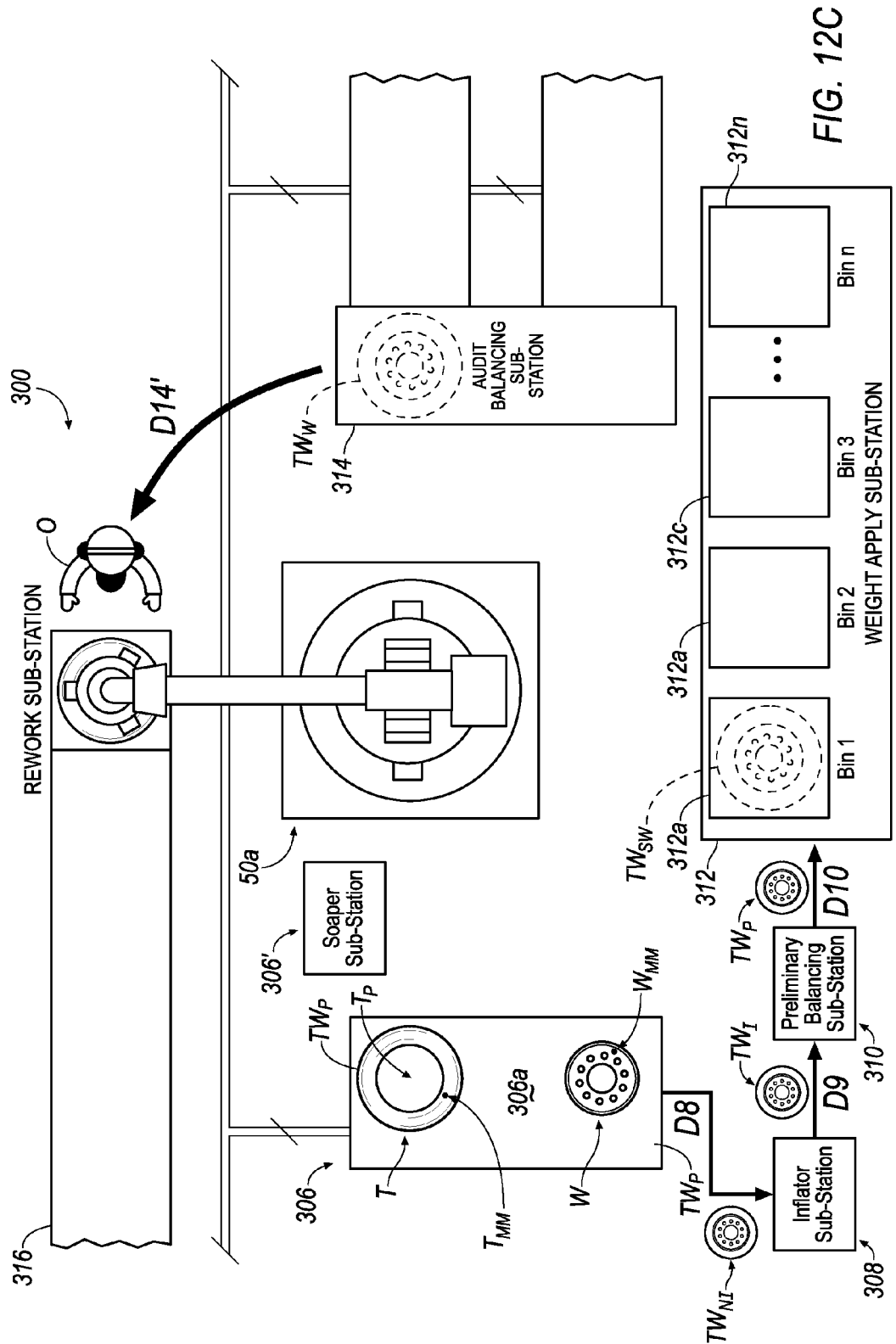
Figure 12D:
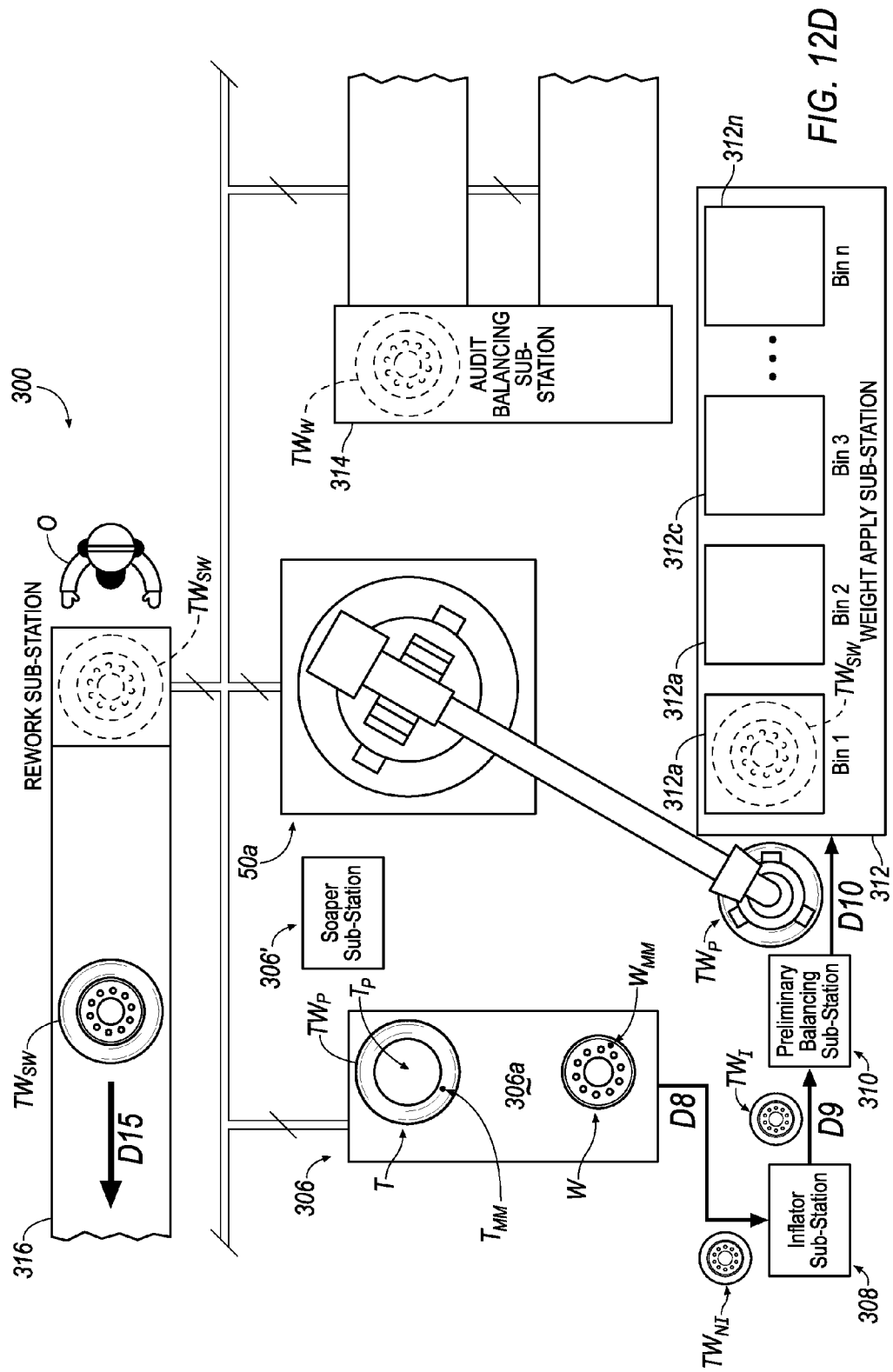

It will be appreciated, however, that after adding one or more supplemental weights to the weighted tire-wheel assembly, $TW_W$, an imbalance may yet still persist. Accordingly, referring to FIGS. 12A-12B, the above described movements in the directions of arrows D13' (see, e.g., FIG. 12A) and D12' (see, e.g., FIG. 12B) are conducted. Then, as seen in FIG. 12C, upon learning of the persistent imbalance at the audit balancing sub-station 314, the supplementally weighted tire-wheel assembly, $TW_{SW}$, may be discharged according to the direction of arrow, D14', to a rework sub-station 316. In an embodiment, the movement of the supplementally weighted tire-wheel assembly, $TW_{SW}$, in the direction of arrow, D14', may be conducted automatically by the device 350, or, alternatively, manually by an operator, O. As seen in FIG. 12D, the persistently imbalanced tire-wheel assembly, $TW_{SW}$, is moved by or from the rework sub-station 316 in the direction according to arrow, D15, for one or more of an inspection, testing, removal of weights, and/or further processing.

It will be appreciated that the audit balancing sub-station 314 described in FIGS. 10A-12D prevents potentially imbalanced tire-wheel assemblies, $TW_W$, $TW_{SW}$, from being discharged by the single-cell workstation 300. One or more reasons may contribute to an imbalanced tire-wheel assembly, $TW_W$, $TW_{SW}$. For example, the device 350 may retrieve a weight from one or more of the bins 312a-312n that do not have an expected value; accordingly, it is probable that, for example, a ½ ounce weight may be improperly placed with and retrieved from the bin 312a when it is expected that the bin 312a contains, for example, ⅛ ounce weights. Further, in an embodiment, one or more of the preliminary balancing sub-station 310 and the audit balancing sub-station 314 may not be properly calibrated, thereby resulting in an imbalance of the tire-wheel assembly, $TW_W$, $TW_{SW}$. As such, in view of the above examples, it will be appreciated that if one or more imbalanced tire-wheel assemblies, $TW_W$, $TW_{SW}$, are discharged according to the direction of arrow, D14', to the rework sub-station 316, the single-cell workstation 300 may be selectively shut down such that an operator, O, may discover and correct one or more issues related to an imbalance of the tire-wheel assembly, $TW_{SW}$.

In an embodiment, once the device 350 interfaces with an inflated/weighted/supplementally weighted tire-wheel assembly, $TW_I/TW_W/TW_{SW}$, the device 350 may perform the function of the preliminary/audit balancing sub-station 314 by spinning the inflated/weighted/supplementally weighted tire-wheel assembly, $TW_I/TW_W/TW_{SW}$, at an extremely fast speed. In an embodiment, the spinning of the inflated/weighted/supplementally weighted tire-wheel assembly, $TW_I/TW_W/TW_{SW}$, may be conducted by interfacing the wheel, W, of the inflated/weighted/supplementally weighted tire-wheel assembly, $TW_I/TW_W/TW_{SW}$, with the claw portion 360 and then subsequently spinning the claw portion 360 relative the arm portion 358.

Due to the fact that noise, vibrations and harshness may be experienced by the device 350 during the spinning of the inflated/weighted/supplementally weighted tire-wheel assembly, $TW_I/TW_W/TW_{SW}$, it will be appreciated that the device 350 may not properly conduct the preliminary/audit balancing operations. As such, it will be appreciated that the noise, vibrations and harshness experienced by the device 350 should be substantially cancelled or eliminated. Accordingly, to substantially cancel or eliminate the noise, vibrations and harshness, the device 350 may engage or otherwise interface with a grounding sub-station (not shown; however, an exemplary grounding sub-station is shown generally at 28 in FIG. 5, and, accordingly it may be surmised that the preliminary balancing sub-station 310 may include one or more components that full-fills the function of a grounding sub-station).

In operation, any portion 354-360 of the device 350 may be retained, clamped or otherwise secured to the balancer grounding sub-station. For example, in an embodiment, the arm portion 358 may be retained, clamped or otherwise secured by the balancer grounding sub-station. In an embodiment, the arm portion 358 may interface with and be retained within a recess formed in a body portion of the balancer grounding station. In another embodiment, one or more clamps may extend from the body of the balancer ground station for, in an embodiment, clamping one or more portions 354-360 of the device 350, such as, for example, the arm portion 358.

Because the device 350 may be retained, clamped or otherwise secured by the balancer grounding station, any noise, vibrations and harshness experienced by the device 350 during the spinning of the inflated/weighted/supplementally weighted tire-wheel assembly, $TW_I/TW_W/TW_{SW}$, is thereby transmitted to and/or absorbed by the balancer grounding sub-station. Thus, the balancer grounding sub-station may negate or minimize the noise, vibration and harshness, otherwise experienced by the device 350 such that the device 350 may repeatably perform the functions of each of the preliminary/audit balancing sub-stations 310, 314. Because the preliminary and audit balancing functions are conduct by one mechanism (i.e., the device 350), the potential of an improperly calibrated balancing sub-station (i.e., one or both of the preliminary and audit balancing sub-stations 310, 314) is eliminated; as such, the device 350 eliminates one potential reason for an imbalanced tire-wheel assembly.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method, comprising the step of:
   determining a spatial location of a match-mark region of a tire that is not joined to a wheel, wherein the tire does not include a physical match mark formed upon a surface or within a body portion of the tire;
   staging the tire upon a virtual match-mark staging-then-mounting sub-station;
   determining a spatial location of a match-mark region of a wheel that is not joined to a tire, wherein the wheel does not include a physical match mark formed upon a surface or within a body portion of the wheel; and
   match-mounting the tire and the wheel by
      aligning the match-mark region of each of the tire and the wheel, and
      disposing the wheel within a central passage formed by the tire.

2. The method according to claim 1, wherein the match-mark region of the tire includes
   a point of lightest weight of the tire, wherein the match-mark region of the wheel includes a heaviest weight of the wheel of the wheel, wherein the point of lightest weight of the tire and the heaviest weight of the wheel of the wheel are utilized in the match-mounting step for executing a weight method of match-mounting the tire and the wheel.

3. The method according to claim 1, wherein, prior to the disposing step, further comprising the step of lubricating the wheel.

* * * * *

UNITED STATES PATENT AND TRADEMARK OFFICE
CERTIFICATE OF CORRECTION

PATENT NO. : 8,863,389 B2
APPLICATION NO. : 13/300349
DATED : October 21, 2014
INVENTOR(S) : Lawrence J. Lawson et al.

Page 1 of 1

It is certified that error appears in the above-identified patent and that said Letters Patent is hereby corrected as shown below:

In the Claims:

At column 19, claim number 2, line number 1, delete the second instance of "of the wheel".

At column 19, claim number 2, line number 3, delete the second instance of "of the wheel".

Signed and Sealed this
Third Day of February, 2015

Michelle K. Lee
*Deputy Director of the United States Patent and Trademark Office*